United States Patent
Tseng et al.

(10) Patent No.: US 12,414,075 B2
(45) Date of Patent: Sep. 9, 2025

(54) MONITORING PAGING MESSAGES AND SMALL DATA TRANSMISSION

(71) Applicant: SHARP KABUSHIKI KAISHA, Sakai (JP)

(72) Inventors: Yung-Lan Tseng, Taipei (TW); Hsin-Hsi Tsai, Taipei (TW); Mei-Ju Shih, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 389 days.

(21) Appl. No.: 17/845,072

(22) Filed: Jun. 21, 2022

(65) Prior Publication Data

US 2022/0408403 A1     Dec. 22, 2022

Related U.S. Application Data

(60) Provisional application No. 63/213,046, filed on Jun. 21, 2021.

(51) Int. Cl.
*H04W 76/20* (2018.01)
*H04W 24/08* (2009.01)
*H04W 68/00* (2009.01)
*H04W 76/19* (2018.01)

(52) U.S. Cl.
CPC ......... *H04W 68/005* (2013.01); *H04W 24/08* (2013.01); *H04W 76/19* (2018.02); *H04W 76/20* (2018.02)

(58) Field of Classification Search
CPC ... H04W 68/005; H04W 68/02; H04W 76/19; H04W 76/20; H04W 74/0833; H04W 24/08; H04L 1/1864; H04L 41/0233; H04L 1/186; H04L 41/023
See application file for complete search history.

(56) References Cited

U.S. PATENT DOCUMENTS

| | | | | |
|---|---|---|---|---|
| 2022/0386407 | A1* | 12/2022 | Kim | H04W 68/02 |
| 2023/0109947 | A1* | 4/2023 | Parkvall | H04W 52/0274 455/418 |

(Continued)

OTHER PUBLICATIONS

3GPP TS 38.331, "3rd Generation Partnership Project; Technical Specification Group Radio Access Network; NR; Radio Resource Control (RRC) protocol specification (Release 16)", V16.4.1 (Mar. 2021).

(Continued)

*Primary Examiner* — Wei Zhao
(74) *Attorney, Agent, or Firm* — ScienBiziP, P.C.

(57) ABSTRACT

A method for a user equipment (UE) to monitor paging messages is provided. The method monitors, while the UE is in an Idle mode, a physical paging channel (PPCH) for receiving paging messages associated with the UE from a serving radio access network (RAN). The method receives one or more paging messages associated with the UE while monitoring the PPCH. The method then determines, whether the one or more paging messages are received during a small data transmission (SDT) procedure. The method further determines whether to terminate the SDT procedure or not after determining that the one or more paging messages are received during the SDT procedure.

12 Claims, 4 Drawing Sheets

(56) References Cited

U.S. PATENT DOCUMENTS

2023/0224997 A1* 7/2023 Agiwal .............. H04W 76/30 370/329
2024/0236941 A1* 7/2024 Esswie .............. H04W 68/02

OTHER PUBLICATIONS

3GPP TS 38.304, "3rd Generation Partnership Project; Technical Specification Group Radio Access Network;NR;User Equipment (UE) procedures in Idle mode and RRC nactive state (Release 16)", V16.4.0 (Mar. 2021).

3GPP TS 38.321, "3rd Generation Partnership Project; Technical Specification Group Radio Access Network; NR; Medium Access Control (MAC) protocol specification (Release 16)", V16.4.0 (Mar. 2021).

3GPP TS 36.321, "3rd Generation Partnership Project; Technical Specification Group Radio Access Network;Evolved Universal Terrestrial Radio Access (E-UTRA); Medium Access Control (MAC) protocol specification (Release 16)", V16.4.0 (Mar. 2021).

3GPP TS 38.214, "3rd Generation Partnership Project; Technical Specification Group Radio Access Network; NR; Physical layer procedures for data (Release 16)", V16.5.0 (Mar. 2021).

3GPP TS 36.331, "3rd Generation Partnership Project; Technical Specification Group Radio Access Network;Evolved Universal Terrestrial Radio Access (E-UTRA); Radio Resource Control (RRC);Protocol specification (Release 16)", V16.4.0 (Mar. 2021).

3GPP TS 36.304, "3rd Generation Partnership Project; Technical Specification Group Radio Access Network;Evolved Universal Terrestrial Radio Access (E-UTRA); User Equipment (UE) procedures in idle mode (Release 16)", V16.3.0 (Dec. 2020).

3GPP TS 38.213, "3rd Generation Partnership Project; Technical Specification Group Radio Access Network; NR; Physical layer procedures for control (Release 16)", V16.5.0 (Mar. 2021).

* cited by examiner

MONITORING PAGING MESSAGES AND SMALL DATA TRANSMISSION

CROSS-REFERENCE TO RELATED APPLICATION(S)

The present application claims the benefit of and priority to U.S. Provisional Patent Application Ser. No. 63/213,046, filed on Jun. 21, 2021, entitled "PAGING MECHANISMS FOR IDLE MODE PACKET TRANSMISSION PROCEDURE," the content of which is hereby incorporated fully by reference herein into the present disclosure.

FIELD

The present disclosure generally relates to wireless communications, and more particularly, a method and a user equipment (UE) for monitoring paging message(s) received from a Radio Access Network (RAN) while the UE is in an Idle mode (e.g., the UE is in an Inactive state or an Idle state).

BACKGROUND

With the tremendous growth in the number of connected devices and the rapid increase in user/network traffic volume, various efforts have been made to improve different aspects of wireless communication for the next-generation wireless communication systems, such as the fifth generation (5G) New Radio (NR), by improving data rate, latency, reliability, and mobility. The 5G NR system is designed to provide flexibility and configurability to optimize the network services and types, accommodating various use cases, such as enhanced Mobile Broadband (eMBB), massive Machine-Type Communication (mMTC), and Ultra-Reliable and Low-Latency Communication (URLLC). As the demand for radio access continues to increase, there is a need for further improvements in wireless communications, such as further improvements in monitoring paging messages in next-generation wireless communication systems.

SUMMARY

As discussed above, the present disclosure is directed to a method for monitoring paging message(s) when the UE is configured for small data transmission (SDT).

In a first aspect of the present disclosure, a method for a user equipment (UE) to monitor paging messages is provided. The method monitors, while the UE is in an Idle mode, a physical paging channel (PPCH) for receiving paging messages associated with the UE from a serving radio access network (RAN). After monitoring the PPCH, the method receives one or more paging messages associated with the UE while monitoring the PPCH. The method then determines whether the one or more paging messages are received during a small data transmission (SDT) procedure. The method further determines whether to terminate the SDT procedure or not after determining that the one or more paging messages are received during the SDT procedure.

In an implementation of the first aspect, the one or more paging messages comprise at least one of a serving core network (CN) paging message or a serving RAN paging message.

In another implementation of the first aspect, monitoring the PPCH for receiving the paging messages associated with the UE comprises monitoring the PPCH for receiving only the serving CN paging messages and not the serving RAN paging messages.

In another implementation of the first aspect, the serving CN paging messages associated with the UE comprise at least one CN paging message that includes (i) fifth generation (5G)-Serving-Temporary Mobile Subscriber Identity (TMSI) (5G-S-TMSI) configured by the serving CN and (ii) Inactive-Radio Network Temporary Identifier (I-RNTI) configured by the serving RAN, and monitoring the PPCH for receiving only the serving CN paging messages comprises decoding the 5G-S-TMSI in the at least one CN paging message and ignoring the I-RNTI.

In another implementation of the first aspect, a medium access control (MAC) entity of the UE is resumed during the SDT procedure, and the method further comprises terminating the SDT procedure by resetting the MAC entity after determining to terminate the SDT procedure.

In another implementation of the first aspect, determining whether to terminate the SDT procedure or not comprises determining to terminate the SDT procedure while the UE is in a radio resource control (RRC) Inactive state, staying in the RRC Inactive state after terminating the SDT procedure, and attempting to connect with the serving RAN by initiating an RRC resume procedure while the UE is in the RRC Inactive state.

In another implementation of the first aspect, determining whether to terminate the SDT procedure or not comprises determining to terminate the SDT procedure while the UE is in a radio resource control (RRC) Inactive state, transitioning from the RRC Inactive state to an RRC Idle state after terminating the SDT procedure, and attempting to connect with the serving RAN by initiating an RRC establishment procedure after transitioning to the RRC Idle state.

In another implementation of the first aspect, the SDT procedure comprises one of a Configured-Grant Small Data Transmission (CG-SDT) procedure or a Random Access Small Data Transmission (RA-SDT) procedure.

In another implementation of the first aspect, the one or more paging messages comprise at least one paging message that includes access type information associated with the SDT procedure, and determining whether to terminate the SDT procedure or not comprises determining whether to terminate the SDT procedure or not based on the access type information in the at least one paging message.

In another implementation of the first aspect, the one or more paging messages comprise at least one paging message that includes at least downlink control information (DCI) and paging records.

In a second aspect, a UE is provided. The UE includes one or more non-transitory computer-readable media storing computer-executable instructions for monitoring paging messages. The UE also includes at least one processor coupled to the one or more non-transitory computer-readable media, and configured to monitor, while the UE is in an Idle mode, a physical paging channel (PPCH) for receiving paging messages associated with the UE from a serving radio access network (RAN). The UE is further configured to receive one or more paging messages associated with the UE while monitoring the PPCH. The UE is further configured to determine, whether the one or more paging messages are received during an SDT procedure. The UE is further configured to determine whether to terminate the SDT procedure or not after determining that the one or more paging messages are received during the SDT procedure.

In an implementation of the second aspect, the one or more paging messages comprise at least one of a serving core network (CN) paging message or a serving RAN paging message.

In another implementation of the second aspect, monitoring the PPCH for receiving the paging messages associated with the UE comprises monitoring the PPCH for receiving only the serving CN paging messages and not the serving RAN paging messages.

In another implementation of the second aspect, the serving CN paging messages associated with the UE comprise at least one CN paging message that includes (i) fifth generation (5G)-Serving-Temporary Mobile Subscriber Identity (TMSI) (5G-S-TMSI) configured by the serving CN and (ii) Inactive-Radio Network Temporary Identifier (I-RNTI) configured by the serving RAN, and monitoring the PPCH for receiving only the serving CN paging messages comprises decoding the 5G-S-TMSI in the at least one CN paging message and ignoring the I-RNTI.

In another implementation of the second aspect, a medium access control (MAC) entity of the UE is resumed during the SDT procedure, and determining whether to terminate the SDT procedure or not comprises determining to terminate the SDT procedure and terminating the SDT procedure by resetting the MAC entity.

In another implementation of the second aspect, determining whether to terminate the SDT procedure or not comprises determining to terminate the SDT procedure while the UE is in a radio resource control (RRC) Inactive state, staying in the RRC Inactive state after terminating the SDT procedure, and attempting to connect with the serving RAN by initiating an RRC resume procedure while the UE is in the RRC Inactive state.

In another implementation of the second aspect, determining whether to terminate the SDT procedure or not comprises determining to terminate the SDT procedure while the UE is in a radio resource control (RRC) Inactive state, transitioning from the RRC Inactive state to an RRC Idle state after terminating the SDT procedure, and attempting to connect with the serving RAN by initiating an RRC establishment procedure after transitioning to the RRC Idle state.

In another implementation of the second aspect, the SDT procedure comprises one of a CG-SDT procedure or an RA-SDT procedure.

In another implementation of the second aspect, the one or more paging messages comprise at least one paging message that includes access type information associated with the SDT procedure, and determining whether to terminate the SDT procedure or not comprises determining whether to terminate the SDT procedure or not based on the access type information in the at least one paging message.

In another implementation of the second aspect, the one or more paging messages comprise at least one paging message that includes at least downlink control information (DCI) and paging records.

BRIEF DESCRIPTION OF THE DRAWINGS

Aspects of the exemplary disclosure are best understood from the following detailed description when read with the accompanying figures. Various features are not drawn to scale, and dimensions of various features may be arbitrarily increased or reduced for clarity of discussion.

DETAILED DESCRIPTION

Figure 1:
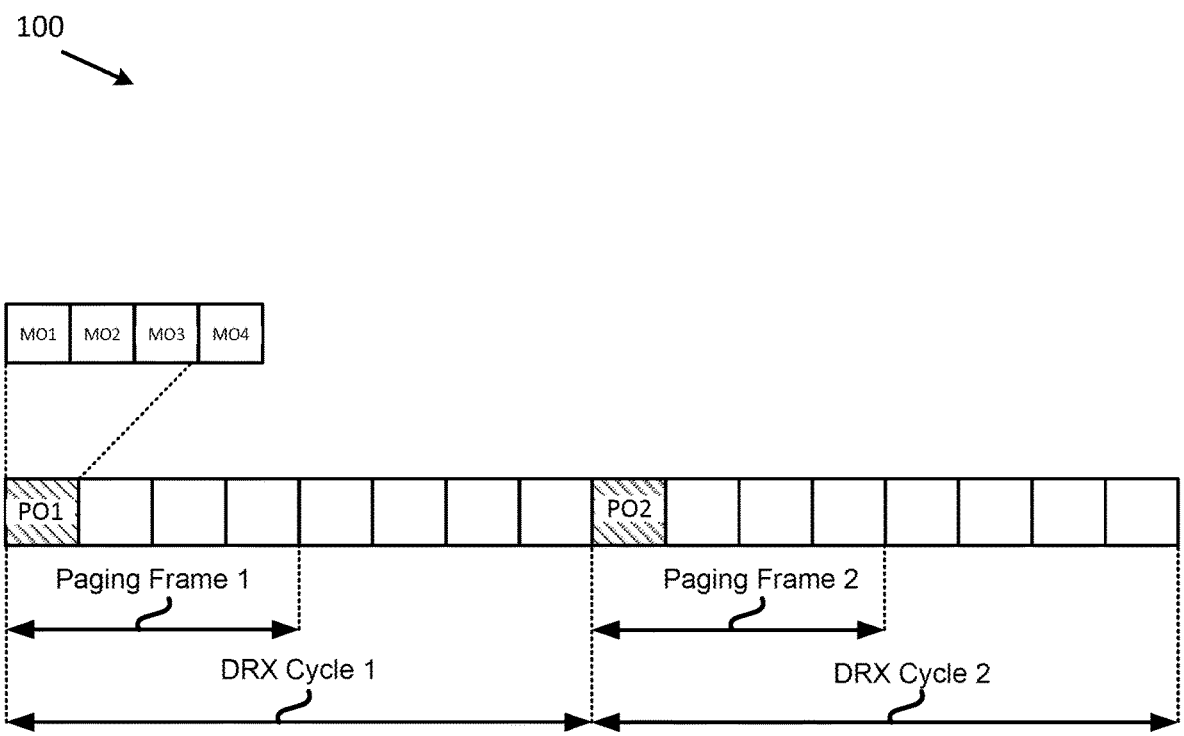
FIG. 1 is a timing diagram illustrating a DRX mechanism for paging monitoring, according to an example implementation of the present disclosure.

Some of the acronyms used in the present disclosure are defined as follows, unless otherwise specified:

| Acronym | Full name |
| --- | --- |
| Alt | Alternative |
| AS | Access Stratum |
| BS | Base Station |
| BSR | Buffer Status Report |
| BWP | Bandwidth Part |
| CBRA | Contention Based Random Access |
| CCCH | Common Control Channel |
| CE | Control Element |
| CFRA | Contention Free Random Access |
| CG | Configured Grant |
| CN | Core Network |
| CORESET | Control Resource Set |
| C-RNTI | Cell-Radio Network Temporary Identifier |
| CSI | Channel State Information |
| CS-RNTI | Configured Scheduling RNTI |
| CSS | Common Search Space |
| DCI | Downlink Control Information |
| DFI | Downlink Feedback Information |
| DG | Dynamic Grant |
| DL | Downlink |
| DM-RS | Demodulation Reference Signal |
| DRB | Data Radio Bearer |
| DRX | Discontinuous Reception |
| FR | Frequency Range |
| HARQ | Hybrid Automatic Repeat reQuest |
| IE | Information Elements |
| LCH | Logical Channel |
| LCP | Logical Channel Prioritization |
| MAC | Medium Access Control |
| MCG | Master Cell Group |
| MPE | Maximum Permissible Exposure |
| Msg | Message |
| NAS | Non-Access Stratum |
| NPN | Non-Public Network |
| NR | New Radio |
| NW | Network |
| NUL | Normal Uplink |
| PCell | Primacy Cell |
| PDCCH | Physical Downlink Control Channel |
| PDSCH | Physical Downlink Shared Channel |
| PDU | Protocol Data Unit |
| PHR | Power Headroom Reporting |
| PHY | Physical Layer |
| PNI-NPN | Public Network Integrated - Non-Public Network |
| PO | Paging Occasion |
| PRACH | Physical Random Access Channel |
| PUCCH | Physical Uplink Control Channel |
| PUSCH | Physical Uplink Shared Channel |
| QCL | Quasi Co Location |
| RA | Random Access |
| RACH | Random Access Channel |
| RAR | Random Access Response |
| RAT | Radio Access Technology |
| Rel | Release |

-continued

| Acronym | Full name |
| --- | --- |
| RLC | Radio Link Control |
| RNA | RAN notification area |
| RNTI | Radio Network Temporary Identifier |
| RO | RACH Occasion |
| RRC | Radio Resource Control |
| RS | Reference Signal |
| RSRP | Reference Signal Received Power |
| Rx | Reception |
| SCell | Secondary Cell |
| SCG | Secondary Cell Group |
| SCS | Subcarrier Spacing |
| SDT | Small Data Transmission |
| SDU | Service Data Unit |
| SI | System Information |
| SIB | System Information Block |
| SNPN | Stand-alone Non-Public Network |
| SPS | Semi-Persistent Scheduling |
| SRB | Signalling Radio Bearer |
| SRS | Sounding Reference Signal |
| SS | Search Space |
| SSB | Synchronization Signal Block |
| SS-RSRP | Synchronization Signal-RSRP |
| SUL | Supplementary Uplink |
| TA | Timing Alignment or Time Advance |
| TAT | Timing Alignment Timer |
| TCI | Transmission Configuration Indicator |
| TS | Technical Specification |
| Tx | Transmission |
| TBS | Transport Block Size |
| TRP | Transmission and Reception Point |
| UCI | Uplink Control Information |
| UE | User Equipment |
| UL | Uplink |
| USS | UE-specific Search Space |

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in some implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to", which specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Any sentence, paragraph, (sub)-bullet, point, action, behavior, term, alternative, aspect, example, or claim described in the present disclosure may be combined logically, reasonably, and properly to form a specific method. Any sentence, paragraph, (sub)-bullet, point, action, behavior, term, alternative, aspect, example, or claim described in the present disclosure may be implemented independently and separately to form a specific method. Dependency, e.g., "based on", "more specifically", "in some implementations", "in one alternative", "in one example", "in one aspect", or etc., in the present disclosure is just one possible example in which would not restrict the specific method. One aspect of the present disclosure may be used, for example, in a communication, communication equipment (e.g., a mobile telephone apparatus, a base station apparatus, a wireless LAN apparatus, and/or a sensor device, etc.), and integrated circuit (e.g., a communication chip) and/or a program, etc. According to any sentence, paragraph, (sub)-bullet, point, action, behavior, term, alternative, aspect, example, implementation, or claim described in the present disclosure, "X/Y" may include the meaning of "X or Y". According to any sentence, paragraph, (sub)-bullet, point, action, behavior, term, alternative, aspect, example, implementation, or claim described in the present disclosure, "X/Y" may also include the meaning of "X and Y". According to any sentence, paragraph, (sub)-bullet, point, action, behavior, term, alternative, aspect, example, implementation, or claim described in the present disclosure, "X/Y" may also include the meaning of "X and/or Y".

The following terminologies are defined but are not necessarily limited to the meaning provided below so as far as to indicate open-ended inclusion or membership in the so-described meaning and the equivalent thereof.

In some implementations, a small data transmission (SDT) may be a UL data transmission by a UE in an RRC_INACTIVE state. Packet size (or data volume) of the UL data may be lower than a specified threshold in some such implementations. In some implementations, the UL data of an SDT may be transmitted during an SDT procedure. In some implementations, the UL data of an SDT may be transmitted via an Msg 3 (e.g., based on a 4-step RA), via an MsgA (e.g., based on a 2-step RA), and/or via a CG resource (e.g., CG type 1). In some implementations, the UL data of an SDT may be transmitted based on a dynamic scheduling and/or a semi-persistent scheduling when the UE is in an RRC_INACTIVE state.

In some implementations, a NW may be a network node, a TRP, a cell (e.g., an SpCell, PCell, PSCell, and/or an SCell), an eNB, a gNB, and/or a base station.

The terms "initiate", "trigger", and/or "start", may be interchangeably used in some implementations of the present disclosure. The terms "terminate", "stop", "release", "suspend", "discard", "end", "complete", "abort", and/or "cancel", may be interchangeably used in some implementations of the present disclosure. The terms "period", "process", and/or "duration" may be interchangeably used in some implementations of the present disclosure. The terms "resource" and/or "occasion" may be interchangeably used in some implementations of the present disclosure. Additionally, the terms "ongoing", "running", and/or "pending" may be interchangeably used in some implementations of the present disclosure.

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art may immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable media, such as memory or other types of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processors (DSPs). Although some of the example implementations described in this specification are oriented to software installed and executed on computer hardware, nevertheless, alternative example implementations implemented as firmware or as hardware or combination of hardware and software are well within the scope of the present disclosure.

The computer readable medium includes, but is not limited to, Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet) through a RAN established by one or more base stations.

It should be noted that, in the present disclosure, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. In some implementations, a UE may be referred to as a PHY/MAC/RLC/PDCP/SDAP/RRC (software) entity or a PHY/MAC/RLC/PDCP/SDAP/RRC (hardware) module. Similarly, a PHY/MAC/RLC/PDCP/SDAP/RRC entity/module may be referred to a UE. The UE is configured to receive and transmit signals over an air interface from/to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present disclosure should not be limited to the above-mentioned entities/protocols.

A base station may include, but is not limited to, a node B (NB) as in the UNITS, an evolved node B (eNB) as in the LTE or LTE-A, a radio network controller (RNC) as in the UNITS, a base station controller (BSC) as in the GSM/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to the network to serve the one or more UEs through a radio interface.

The base station may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate sidelink (SL) resources for supporting Proximity Service (ProSe) or Vehicle to Everything (V2X) services. Each cell may have overlapped coverage areas with other cells. In Multi-RAT Dual Connectivity (MR-DC) cases, the primary cell (PCell) of a Master Cell Group (MCG) or the primary SCG cell (PSCell) of a Secondary Cell Group (SCG) may be referred to as a Special Cell (SpCell).

A cell or a serving cell may include a Primary Cell (PCell), a Primary SCG Cell (PSCell), or a Secondary Cell (SCell). The serving cell may be an activated or a deactivated serving cell. For Dual Connectivity operation, the term Special Cell (SpCell) refers to the PCell of the MCG (Master Cell Group) or the PSCell of the SCG (Secondary Cell Group) depending on if the MAC entity is associated to the MCG or the SCG, respectively. Otherwise, the term Special Cell refers to the PCell.

The PCell may refer to the SpCell of an MCG. The PS Cell may refer to the SpCell of an SCG. MCG may refer to a group of serving cells associated with the Master Node (MN), including the SpCell and optionally one or more SCells. An SCG may refer to a group of serving cells associated with the Secondary Node (SN), including the SpCell and optionally one or more SCells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology, as agreed in 3GPP, may serve as a baseline for NR waveform. The scalable OFDM numerology, such as the adaptive sub-carrier spacing, the channel bandwidth, and the Cyclic Prefix (CP), may also be used in some implementations of the present disclosure. Additionally, at least two coding schemes may be considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services, (E-UTRA/NR) sidelink services, or (E-UTRA/NR) V2X services.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

In 3rd Generation Partnership Project (3GPP) technical specifications, a UE in an Idle mode (e.g., an RRC Inactive state or an RRC Idle state in NR/E-UTRA protocols) may need to monitor paging occasions (PO) for paging messages delivered from a serving RAN and/or a serving CN (e.g., though a serving RAN). However, during an SDT procedure, whether the UE has to keep monitoring the POs for the paging messages may not be clear. In some implementations, the paging messages may include any combinations of paging Downlink Control Information (DCI), short messages, and/or paging records.

In some implementations, a short message may be transmitted by a base station (or a cell) via downlink control information (DCI) (e.g., via DCI format 1_0 with Cyclic Redundancy Check (CRC) scrambled by P-RNTI (Paging-Radio Network Temporary Identifier)), in one or more configured Physical Downlink Control Channel(s) (PDCCH(s)), or in a PDCCH monitoring occasion. In addition, the base station (or cell) may indicate locations of the PDCCH (e.g., within physical radio resource blocks) to the UE (e.g., via broadcasting system information or UE-specific DL control signaling) by indicating one or more Search Space configurations (e.g., paging search spaces), which may be associated with the initial (DL) Bandwidth Part (BWP) or the default (DL) BWP of the serving cell.

In some implementations, the short message may include at least one of the following information: Public Warning Service (PWS) indication (e.g., via etwsAndCmasIndication), System information Update indication (e.g., via systemInfoModification), and stop paging monitoring indication (e.g., via stopPagingMonitoring). In some implementations, the short message in the paging DCI (e.g., DCI format 1_0 with CRC scrambled by P-RNTI) may or may not be associated with a paging message, where the paging DCI may be transmitted in the PDCCH. The paging message may include a paging record list, which may include at least one UE ID (e.g., 5G-S-TMSI or I-RNTI) to inform at least one UE to connect with the serving network (e.g., radio access network, such as an NR-RAN or an E-UTRAN) and a CN (e.g., 5GC or EPC). In addition, physical resources (e.g., physical resource blocks across the time/frequency domain) of paging messages (e.g., in the Physical Downlink Shared Channel (PDSCH) following the PDCCH in the time domain) may also be indicated by the paging DCI.

In some implementations, paging messages may include (at least) one paging record, which is composed with (at least) a CN paging message (e.g., a CN-initiated paging or a CN paging) and/or a RAN paging message (e.g., RAN-initiated paging or RAN paging). After receiving paging record(s) indicated by a paging message, which may be scheduled by paging DCI, a UE may decode the paging record(s) for a CN paging by using a 5G-S-TMSI and/or for RAN paging by using full I-RNTI. Besides CN paging/RAN paging reception, UEs in an RRC_IDLE state or in an RRC_INACTIVE state may monitor a (physical) paging channel (PPCH) for SI change indication in their own paging occasions every Discontinuous Reception (DRX) cycle. Conventionally, UEs in an RRC_CONNECTED state may also monitor (e.g., the PPCH) for SI change indication in any paging occasion at least once per (system information, SI) modification period if the UE is provided with a common search space, including pagingSearchSpace, searchSpaceSIB1 and searchSpaceOtherSystemInformation, on the active (e.g., the initial) BWP (e.g., as specified in 3GPP TS 38.213).

In some implementations, after a short message reception, an Earthquake and Tsunami Warning System (ETWS) or a Commercial Mobile Alerting System (CMAS) capable UE that is in an RRC_IDLE state or in an RRC_INACTIVE state may monitor the paging channel for notifications, such as PWS notification, in the UE's own paging occasion every DRX cycle. The ETWS or CMAS capable UEs that is in an RRC_CONNECTED state may monitor for an indication about a PWS notification in any paging occasion at least once every defaultPagingCycle if the UE is provided with a common search space, including pagingSearchSpace, searchSpaceSIB1 and searchSpaceOtherSystemInformation, on the active (e.g., the initial) BWP.

In some implementations, for a UE that is in an RRC_INACTIVE state, the paging record may include, at least, a UE identity (e.g., 5G-S-TMSI and/or full I-RNTI) and an accessType (e.g., access type=ENUMERATED {non3GPP}). For example, the accessType may indicate whether the paging message is originated, due to Protocol Data Unit (PDU) sessions, from non-3GPP access. In some implementations, after receiving a paging record with an access type, the UE may forward the access type along with the UE identity to the upper layers (e.g., an RRC layer or a NAS layer).

In some implementations, a DRX mechanism may be applied for paging monitoring (e.g., PDCCH monitoring for paging), which may imply that the UE may not need to monitor the PDCCH (and/or PO) continuously. FIG. 1 is a timing diagram 100 illustrating a DRX mechanism for paging monitoring, according to an example implementation of the present disclosure. As shown in FIG. 1, a UE may be configured with DRX cycle(s) and several parameters for determination of PO(s). In some implementations, the UE may only monitor one PO per DRX cycle. In some implementations, the UE may only monitor one PO within a paging frame in a DRX cycle. In some implementations, the UE may only monitor a paging occasion (e.g., PO1) within a paging frame (e.g., Paging Frame 1) within a DRX cycle (e.g., DRX Cycle 1). In some implementations, the UE may only monitor a paging occasion (e.g., PO2) within a paging fame (e.g., Paging Frame 2) within a DRX cycle (e.g., DRX Cycle 2). In other implementations, for example, under a multi-beam operation or an operation with shared spectrum channel access, the UE may monitor multiple PDCCH monitoring occasions (MOs) in a PO. In some implementations, the UE may monitor multiple PDCCH MOs (e.g., MO1, MO2, MO3, and MO4) in a paging occasion (e.g., PO1). In some implementations, the UE may decide to monitor the PDCCH MOs based on the following configurations provided by the serving RAN: pagingSearchSpace configuration, firstPDCCH-MonitoringOccasionOfPO (e.g., the first PDCCH monitoring occasion for paging of each PO of the PF), nrofPDCCH-MonitoringOccasionPerSSB-InPO (e.g., the number of PDCCH MOs corresponding to an SSB within a PO).

In some implementations, a PO may be a set of "S" (consecutive) PDCCH monitoring occasions where "S" is the number of actual transmitted Synchronization Signal Blocks (SSBs) determined based on a parameter (e.g., ssb-PositionsInBurst) in System Information Block 1 (SIB1). In some such implementations, the $K^{th}$ PDCCH monitoring occasion (e.g., K being a positive integer) for paging in the PO may correspond to the $K^{th}$ transmitted SSB. In some implementations, a base station (or a cell configured by a base station) may broadcast the DRX configuration via broadcasting system information, such that the UEs in an RRC_IDLE, RRC_INACTIVE, or RRC_CONNECTED state may be able to calculate their respective POs.

In some implementations, paging mechanisms (e.g., RAN or CN paging) and an SDT procedure may have mutual impact on one another. In some implementations, the paging mechanisms may include CN paging mechanisms during an SDT procedure and RAN paging mechanisms during an SDT procedure. In some implementations, paging mechanisms may have an impact on an SDT procedure. In some implementations, the paging mechanisms may not be limited by the Radio Access Technology or RAT type (e.g., E-UTRA, NR, NB-IoT, eMTC), CN type (e.g., PLMN/SNPN/PNI-NPN) and/or deployments (e.g., Terrestrial Network/Non-Terrestrial Network).

In some implementations, the CN paging mechanisms during an SDT procedure, as described in more details below, may not be limited only to the CN paging and may also be applicable to other scenarios (e.g., RAN paging).

UE Monitoring CN Paging Messages During an SDT Procedure:

In some implementations, a UE may monitor a paging occasion or a paging channel for receiving paging messages. The UE may receive a paging DCI message and a paging record indicated by the paging DCI during an SDT procedure (e.g., based on the paging occasion calculated by the UE during a DRX cycle) or while the UE is configured to perform an SDT procedure. In some such implementations, the paging message may include any combination of a short message indication, a short message, and/or scheduling information of the following paging message(s).

In some implementations, the UE may calculate the UE's paging occasion during a DRX cycle based on a UE ID (e.g., 5G-S-TMSI modulo 1024 in NR or 5GC system, IMSI for LTE or EPC system) as described in 3GPP specifications (e.g., TS 38.331, TS 38.304, TS 36.331, and TS 36.304).

In some implementations, the CN paging message may be generated by an EPC or a 5GC. In some implementations, the UE may receive the CN paging message(s) via forwarding of the serving RAN. In some such implementations, the serving RAN may be an NR-RAN or an E-UTRAN.

In some implementations, the UE may be registered with a Public Land Mobile Network (PLMN). In some other implementations, the UE may be registered with a non-public network (e.g., a Standalone Non-Public Network (SNPN) or a Public Network Integrated-NPN (PNI-NPN)). In some implementations, the NW (e.g., a PLMN, an SNPN, a PNI-NPN) may attempt to inform a target registered UE to connect or reconnect with the registered NW by transmitting at least one paging message (e.g., a CN paging message) to the target UE.

In some implementations, the UE may stay in an RRC Inactive state after the UE receives a CN paging message which includes the UE's 5G-S-TMSI. In some implementations, the UE may move to an RRC Idle state after receiving a CN paging message which includes the UE's 5G-S-TMSI. In some implementations, the upper layers (e.g., the NAS layer in the UE side) may instruct the UE to move to an RRC Idle state after the RRC entity forwards the received paging message (e.g., and also the AccessType associated with the CN paging message of the UE) to the NAS layer. In some implementations, after receiving the instruction from the NAS layer, the RRC entity may cause the UE to move to an RRC Idle state. In some other implementations, the RRC entity may also instruct to reset the MAC entity, PDCP entity, RLC entity, and/or SDAP entity associated with the radio bearers that are configured or enabled to initiate an SDT procedure. In some additional implementations, the RRC entity may also instruct the MAC entity to stop uplink packet transmissions associated with the radio bearers that are configured or enabled to initiate an SDT procedure (e.g., the HARQ buffer in the MAC entity may be flushed and the MAC entity may stop the uplink packet transmission associated with the SDT procedure).

In some implementations, the UE may release the stored SDT configuration (e.g., release the (type 1) configured grant resources, or (2-step/4-step) random access resources configured for the SDT procedures) after receiving the CN paging message from the serving RAN. In some other implementations, the stored UE Inactive Access Stratum (AS) context may also be released by the CN paging message reception (e.g., when the received CN paging message including the UE's 5G-S-TMSI or the UE's IMSI).

In some implementations, the UE may terminate, stop, release, or abort an SDT procedure/configurations if the UE receives the CN paging message (e.g., when the ue-Identity that is included in the PagingRecord matches the UE identity allocated by the upper layers) during the SDT procedure. In some such implementations, after the termination of the SDT procedure, the UE may move to an RRC_IDLE state and perform an RA procedure and/or an RRC connection setup or (re)establishment procedure to access the NW/RAN in response to the reception of the CN paging message.

In some implementations, the UE may stay in an RRC_INACTIVE state and/or initiate an RRC connection resume procedure if the UE receives the CN paging message (e.g., when the UE Identity that is included in the PagingRecord matches the UE identity allocated by the upper layers) during the SDT procedure. In some implementations, the UE may perform the stopping/releasing, or abortion of the SDT procedure/configurations upon going to an RRC_IDLE state if the UE receives the CN paging message (e.g., when the UE-Identity that is included in the PagingRecord matches the UE identity allocated by the upper layers) during the SDT procedure. In some such implementations, after entering the RRC_IDLE state, the UE may perform an RA procedure (e.g., 2-step or 4-step RA procedure) and/or an RRC connection setup or establishment procedure in response to the reception of the CN paging message.

In some implementations, the UE may trigger a MAC reset procedure after receiving a CN paging message, which may include the UE's 5G-S-TMSI or the UE's WISP ng-5G-S-TMSI/s-TMSI, from the serving RAN. In some such implementations, the serving RAN may be an E-UTRAN or an NR-RAN.

In some implementations, the UE (e.g., the RRC entity) may trigger a MAC reset procedure while the UE stops/releases/aborts a running SDT procedure. In some implementations, the UE (e.g., the RRC entity) may stop/release/freeze the active timers associated with the SDT procedure (e.g., SDT failure timer, which may be configured and be counted to zero by the RRC entity) while the UE stops/releases/aborts a running SDT procedure.

In some implementaions, UE may configure and start to count a SDT failure timer to zero upon transmission of RRCResumeRequest or RRCResumeRequest1 to the serving cell when the resume procedure is initiated for SDT. The initial value of the SDT failure timer may be configured by the serving RAN (e.g., as part of SDT configuration) or may be pre-configured by the serving RAN or be pre-defined in the technical specification. Then, the UE may stop the running SDT failure timer upon reception of RRCResume, RRCSetup, RRCRelease, RRCRelease with suspendConfig or RRCReject message from the serving cell. In some implementations, the UE may also stop the running SDT failure timer while cell re-selection and upon relay (re) selection is triggered by the UE (during the SDT procedure). If the SDT failure timer expires, the UE may consider the SDT procedure fails and then the UE may terminate the SDT procedure (e.g., UE may terminate all of the timers associated with the SDT procedure, reset the MAC entity and flush the HARQ buffer associated with the SDT procedure).

UE Ignoring or Skipping Paging During an SDT Procedure:

In some implementations, a UE may ignore both CN or RAN paging, or skip RAN or CN paging while the UE is performing an SDT procedure or when the UE is configured with an SDT configuration (e.g., to perform an SDT procedure).

In some implementations, the UE may monitor only short messages during the paging cycle (or the DRX cycle) during an SDT procedure (e.g., when the SDT procedure is ongoing). In some such implementations, the UE may decode only paging DCI during the paging cycle (or the DRX cycle) during an SDT procedure ongoing. In some implementations, the UE may not decode the following paging records in an attempt to determine the CN paging message (e.g., 5G-S-TMSI) of the UE if the UE still needs to receive the paging records for other usages (e.g., RAN paging message reception or Access Type reception). In some such implementations, the UE may ignore the fields in the paging DCI, where the fields may indicate the time/frequency resources of the PDSCH carrying the paging message. In some implementations, the UE may read or decode the fields in the paging DCI, where the fields indicate the time/frequency resources of the PDSCH carrying the paging message, and the UE may not monitor the time/frequency resources of the PDSCH for the paging message. In some implementations, the UE may stop the paging message reception by ignoring the stopPagingMonitoring indication regardless of whether the stopPagingMonitoring indicates that the UE should or should not stop monitoring the PDCCH occasions for paging during such a paging occasion (e.g., while or after the short message or short paging DCI is decoded successfully).

In some implementations, if the UE receives paging DCI(s) during an SDT procedure, the UE may assume that there is no scheduling information for the paging message present in the paging DCI. In some implementations, if the UE receives the paging DCI during an SDT procedure, the UE may assume that there is only a short message present in the paging DCI.

In some implementations, the short message may be configured/transmitted as an 8-bit sequence, as shown in Table 1 below.

TABLE 1

Short Message Indicator

| Bit Field | Short Message Indicator |
|---|---|
| 00 | Reserved |
| 01 | Only scheduling information for Paging is present in the DCI |
| 10 | Only short message is present in the DCI |
| 11 | Both scheduling information for Paging and short message are present in the DCI |

In some implementations, if the UE receives the paging DCI during an SDT procedure, the UE may assume that there is only a short message present in the paging DCI even if the short message indicator, which may be included in the paging DCI, indicates a value of "01" and/or "10" and/or "11", as shown in Table 1.

In some implementations, even if the UE receives the paging DCI and the included short message indicator indicates the value "01" or "11" during an SDT procedure, the UE may not attempt to receive the paging message indicated by the scheduling information for paging.

In some implementations, if the UE receives the paging DCI and the included short message indicator indicates "01" or "11" during an SDT procedure, the UE may attempt to receive the paging message based on the scheduling information for paging. In some implementations, upon receiving the paging message, the UE may not check or determine if the ue-Identity included in the Paging Record matches the UE's stored full I-RNTI. In some such implementations, the UE may only check or determine if the ue-Identity that is included in the PagingRecord matches the UE identity allocated by the upper layer (e.g., the 5G-S-TMSI/s-TMSI or IMSI). In some implementations, the UE may forward the received UE identity (e.g., allocated by the upper layer) to the upper layer (e.g., NAS layer). In some such implementations, the upper layer may determine whether or not to instruct the AS layer to move the UE to an RRC_IDLE state (e.g., or remain in RRC_INACTIVE state).

In some implementations, while an SDT procedure is terminated, released, finished, interrupted, stopped, aborted, deleted, or removed, the UE may start or restart monitoring the RAN or CN paging messages, for example, by decoding the short messages and the paging records that are indicated by the paging DCI.

In some implementations, the serving cell (e.g., the anchor cell of the UE) may further configure the UE to keep monitoring or not to monitor any CN paging messages during an SDT procedure (e.g., when the SDT procedure is ongoing). In some implementations, the serving cell may transmit the configuration via broadcasting system information or UE-specific DL RRC signaling (e.g., as part of an SDT configuration in an RRCReconfiguration message or an RRCRelease message). In some implementations, the UE may release such configuration when the UE moves to an RRC_IDLE state.

In some implementations, a UE may indicate to the network (e.g., by reporting its capability) whether the UE supports receiving or decoding the paging DCI, a paging record, and/or a paging message when an SDT procedure is ongoing. In some implementations, the UE may report the UE capability about the paging DCI reception via a UE capability enquiry procedure (e.g., a serving cell may transmit a UE capability enquiry message to instruct or request the UE to transmit the UE capability about SDT, and then, the UE may report the UE's capability for SDT to the serving cell).

Access Type in Paging Record:

In some implementations, an upper layer (e.g., an RRC entity) in UE may decide whether or not to interrupt an active SDT procedure based on an access type, which may be received by the UE via a paging record reception. In some implementations, the access type may include, at least, one of the following: a non3GPP access type; a Multicast/Broadcast Service (IVIES), for example, the MBS session identity (or a segment of IVIES identity) may be further indicated in the paging record; a network slice, for example, the network slice identity (or a segment of network slice identity), such as Single Network Slice Selection Assistance Information (S-NSSAI), may be further indicated in the paging record; and a URLLC service indication, which may indicate that the NW pages the UE for, at least, one URLLC service.

In some implementations, the access type may include at least one of non3GPP and 3GPP access type (e.g., ENUMERATED {non3GPP, 3GPP}). In some implementations, if the access type is absent, it may imply that the access type is '3GPP'. In some implementations, the paging records may include paging causes. In some implementations, a paging cause may be associated with a paging record, which includes one or more UE-identities, such as full I-RNTI/5G-S-TMSI/IMSI/s-TMSI. In some implementations, the content of the paging cause may include, at least, one of the MBS, a target service (e.g., network slice), and URLLC. In some implementations, the paging cause may be in the format of ENUMERATED {'MBS', 'network slice', 'URLLC' ID}. In some implementations, the paging cause may be associated with the '3GPP' access type.

In some implementations, the content of a paging cause may be associated with, at least, one of MBS (which may be associated with an MBS service identity predefined by a network operator or a service provider), a target service (which may be associated with a network slice ID, such as S-NSSAI) and URLLC (which may be associated with a service ID). In some implementations, the paging cause may be in a format of ENUMERATED {IVIES ID, network slice ID, URLLC ID}. In some implementations, the paging cause may be associated with the '3GPP' access type.

In some implementations, the paging cause may be associated with a paging message. In other implementations, the paging cause may be associated with a UE ID (e.g., 5G-s-TMSI, (full/short) I-RNTI, s-TMSI, IMSI).

In some implementations, if the access type and/or paging cause have a higher priority than the ongoing SDT procedure, the UE may interrupt the active SDT procedure and respond to the access type and/or paging cause. In some implementations, if the access type and/or paging cause have a lower priority than or have the same priority as the ongoing SDT procedure, the UE may continue performing the active SDT procedure and may respond to the access type and/or paging cause after the SDT procedure completes. In other implementations, the UE may interrupt the active SDT procedure (e.g., an RA-SDT procedure or a CG-SDT procedure) if the access type or paging cause has a higher priority than the SDT procedure. In some implementations, the UE may be configured or preconfigured with a priority (e.g., a priority value of an SDT procedure and/or a priority value of a target service) or be configured with a priority by a serving cell/NW via dedicated signaling (e.g., NAS signaling, RRC signaling) or broadcasting system information. In other implementations, such priority rules or priority values may be considered as a part of an SDT configuration, which may be released when the UE decides to release the stored SDT configuration (e.g., when the UE moves to an RRC_IDLE state).

In some implementations, the UE may continue the active SDT procedure regardless of the access type and/or paging cause received by the UE. In some implementations, the UE may respond to the received access type and/or paging cause after the SDT procedure completes. In some such implementations, the UE may report the received access type or paging cause to the upper layers (e.g., the RRC layer/NAS layer) after the running SDT procedure is finished, interrupted, or aborted.

In some implementations, the UE may terminate the active SDT procedure after receiving the access type and/or paging cause (if any) regardless of receiving the access type and/or paging cause.

In some implementations, the SDT procedure may start or initiate when the UE initiates or starts an SDT failure timer for an activated SDT procedure. In other implementations, the SDT procedure may terminate when the SDT failure timer stops, is released, terminates, or expires. In some implementations, the UE may keep monitoring or may not monitor the PDCCH MO for paging, the PO, the paging DCI, the short messages and/or paging records while the SDT failure timer is counting or running. In other implementations, the UE may or may not monitor the PDCCH MO for paging, the PO, the paging DCI, the short messages and/or paging records while the SDT failure timer is counting or running, for example, while the SDT procedure is still active. In some implementations, once the SDT procedure terminates or once the SDT failure timer stops, is released, terminates, or expires, the UE may resume monitoring or continue monitoring the PDCCH occasions for paging.

In some implementations, the RAN paging mechanisms during an SDT procedure, as described in more detail below, may not be limited only to the RAN paging and may also be applicable to other scenarios (e.g., CN paging).

UE Monitoring RAN Paging Messages During an SDT Procedure:

In some implementations, a UE may monitor a paging occasion or a paging channel for receiving paging messages. The UE may receive a paging DCI message and a paging record indicated by the paging DCI during an SDT procedure (e.g., based on the paging occasion calculated by the UE during a DRX cycle) or when the UE is configured with an SDT configuration (e.g., to perform an SDT procedure).

In some implementations, the UE may calculate the UE's paging occasion during a DRX cycle based on a UE ID (e.g., 5G-S-TMSI modulo 1024), for example, as specified in 3GPP specifications (e.g., TS 38.331 and TS 38.304).

In some implementations, the RAN paging message may be generated by an anchor cell (e.g., the cell that configures the UE to move to an RRC_INACTIVE state and may be configured itself by a base station, such as a gNB in NR protocols or an eNB in E-UTRA protocols) and may be forwarded by one or more cells in the serving RAN (e.g., via the backhaul connection, such as an X2, an Xn, or an F1 interface between the base stations). In some such implementations, the one or more cells may broadcast the RAN paging messages via airlink (e.g., a Uu link or a Uu interface), for example, through the paging channels.

In some implementations, the UE may be registered with a Public Land Mobile Network (PLMN). In other implementations, the UE may be registered with a non-public network (e.g., SNPN or PNI-NPN). In other implementations, the UE may have an RRC connection (e.g., an inactive/suspended RRC connection) with the serving RAN, which may be an E-UTRAN or an NR-RAN (e.g., an NR-RAN or an NR-AN). In some such implementations, the UE may stay in the RRC_INACTIVE state after the UE receives the RAN paging message, which may include a corresponding I-RNTI (e.g., a full I-RNTI).

In some implementations, the UE may abort, terminate, stop, or release an active SDT procedure after receiving one or more RAN paging messages from the serving cell.

In some implementations, the UE may keep performing an SDT procedure (e.g., until the serving cell delivers one RRCRelease message to the UE to terminate the SDT procedure or until the SDT failure timer of the UE side expires) if the UE receives the RAN paging message (e.g., if the ue-Identity that is included in the PagingRecord matches the UE's stored fullI-RNTI) during the SDT procedure.

In some implementations, the UE may stay in the RRC_INACTIVE state if the UE receives a RAN paging message (e.g., if the ue-Identity that is included in the PagingRecord matches the UE's stored fullI-RNTI) during the SDT procedure.

In some implementations, the UE may not initiate an RRC connection resume procedure even if the UE receives the RAN paging message (e.g., if the ue-Identity that is included in the PagingRecord matches the UE's stored fullI-RNTI) during the SDT procedure. In some implementations, the UE may move to an RRC_IDLE state if the UE receives the RAN paging message (e.g., if the ue-Identity that is included in the PagingRecord matches the UE's stored fullI-RNTI) during the SDT procedure.

In some implementations, the UE may trigger a MAC reset after receiving a RAN paging message, which may include the UE's full I-RNTI, from the serving RAN.

UE Ignoring or Skipping Paging in an SDT Procedure:

In some implementations, a UE may monitor only the paging DCI or short messages during the paging cycle (or DRX cycle) in an SDT procedure. In some implementations, the UE may not decode the following paging record(s) in an attempt to find out the RAN paging message (e.g., a full I-RNTI) of the UE if the UE still needs to receive the paging records for other usages (e.g., CN paging message reception and/or Access Type reception). In other implementations, the UE may only decode the short message, while the UE is decoding the paging DCI. In other implementations, the UE may ignore or may not decode the other part of the paging DCI (e.g., the scheduling information for Paging record transmission).

In some implementations, when an SDT procedure terminates, is released, finishes, or is interrupted, the UE may start (or restart) monitoring the RAN paging messages by decoding the paging DCI or short messages and the paging message or paging records indicated by the paging DCI.

In some implementations, the UE may release the stored SDT configuration (e.g., the configured grant (e.g., type 1) or random access resource (e.g., 2-step/4-step) configured for SDT procedures) and may stay in an RRC_INACTIVE state after receiving the RAN paging message from the serving RAN. In other implementations, the UE may keep or retain the stored SDT configuration (e.g., the configured grant (e.g., type 1) or random access resource (e.g., 2-step/4-step) configured for SDT procedures) and may stay in an RRC_INACTIVE state after receiving the RAN paging message from the serving RAN. In other implementations, the stored AS context in a UE that is in an Inactive state (e.g., the UE Inactive AS Context) may not be released by the RAN paging message reception.

In some implementations, the serving cell (e.g., the anchor cell of the UE) may further configure the UE to keep monitoring or not to monitor the RAN paging messages during an SDT procedure. In some implementations, the serving cell may transmit the configuration via broadcasting system information or UE-specific DL RRC signaling (e.g., as a part of an SDT configuration or as part of suspend configuration).

In some implementations, the SDT procedure may start or initiate when the UE initiates or starts the SDT failure (or SDT failure detection) timer (e.g., such as T319a as described in in 3GPP TS 38.331), for an activated SDT procedure. In other implementations, the SDT procedure may terminate when the SDT failure (or SDT failure detection) timer stops, is released, terminates, or expires. In some implementations, the UE may keep monitoring or may not monitor the PDCCH MO for the paging, PO, paging DCI, short messages and/or paging records while the SDT failure timer is counting or running. In some implementations, the UE may or may not monitor the PDCCH MO for the paging, PO, paging DCI, short messages and/or paging records while the SDT failure timer is counting or running, for example, when the SDT procedure is still active.

In some implementations, different paging mechanisms (e.g., RAN or CN paging) may impact the SDT procedure. For example, in RAN2, the network may assume a specific UL-BWP to be configured for the SDT and may impact on which DL-BWP the UE may apply. In some implementations, paging messages may only be transmitted in an initial DL-BWP. In some implementations, the UE may also trigger the later RRC procedures on the initial UL-BWP associated with the serving cell.

Impacts of Paging to an SDT Procedure:

Impact of BWP Configuration

In some implementations, a UE may be configured with one or more Small Data Transmission-Bandwidth Parts (SDT-BWPs), for example, in a UL direction, which may include one or more configured grant configurations for a CG-SDT procedure and/or one or more random access resource configurations for an RA-SDT procedure.

In some implementations, a default BWP (e.g., the initial BWP, DL BWP, or another DL-BWP, which may be configured by the serving cell or may be UE specific) may also be configured to be associated with the SDT-BWP. In other implementations, a default BWP specific for SDT (e.g., a default SDT-BWP_DL) may be configured to the UE (e.g., via UE-specific RRC signaling or cell specific common control signaling, such as broadcasting system information). In some implementations, the serving cell may configure the SDT-BWP_DL independently, for example, with the default (DL) BWP. In some such implementations, if the SDT-BWP_DL is configured for SDT procedures, the UE may switch the UE's operating DL BWP to the SDT-BWP_DL when an SDT procedure (e.g., a CG-SDT procedure or an RA-SDT procedure) is initiated. In some implementations, the initial DL-BWP may be a subset of the SDT-BWP_DL in the frequency domain (e.g., the SDT-BWP_DL may overlap the initial DL BWP).

In some implementations, the configured default DL-BWP for an SDT procedure (e.g., an SDT-BWP_DL) may be associated with one or more pagingSearchSpaces. In some implementations, the UE may not need to perform BWP switching during the SDT procedure for paging DCI monitoring. In some implementations, the configured default DL-BWP for the SDT procedure may not be associated with any pagingSearchSpace. In some implementations, the UE may need to switch the DL-BWP (e.g., from an SDT-BWP_DL to the initial (DL) BWP or a default BWP) to monitor the PDCCH MO for paging, the PO, and/or the paging DCI to receive the short messages and the paging records.

In some implementations, the configured default DL-BWP for an SDT procedure (e.g., an SDT-BWP_DL) may be paired or not paired with the SDT-BWP (e.g., an SDT-BWP_UL in uplink direction), for example, based on a Time Division Duplex (TDD) mechanism or a Frequency Division Duplex (FDD) mechanism.

In some implementations, the default DL-BWP for an SDT procedure (e.g., an SDT-BWP_DL) may not be configured with RACH resources (e.g., a ra-SearchSpace for Random Access Response monitoring) for the UE to initiate a non-SDT procedure. For example, the UE may be triggered to initiate an RRC establishment or RRC resume procedure after receiving a CN paging message (or a RAN paging message) during an SDT procedure. In some such implementations, the UE may or may not switch the UE's operating DL-BWP from the SDT-BWP_DL to the initial DL-BWP (or the default DL-BWP) for a triggered non-SDT procedure (e.g., an RRC establishment or RRC resume procedure).

In some implementations, the default UL-BWP for an SDT procedure may not be configured with RACH resources for the UE to initiate a non-SDT procedure. For example, the UE may be triggered to initiate an RRC resume procedure after receiving a RAN paging message during an SDT procedure. In some such implementations, the UE may switch the UE's operating UL-BWP from the SDT-BWP (e.g., an SDT-BWP_UL) to the initial UL-BWP (or the default UL-BWP) for a triggered non-SDT procedure (e.g., an RRC resume procedure).

In some implementations, the UE may be configured with a RACH configuration for a non-SDT procedure in the SDT-BWP (e.g., in DL and/or UL directions). In some such implementations, the UE may not need to switch from an SDT-BWP to another UL-BWP (e.g., the initial UL-BWP or the default UL-BWP) while the UE is triggered to initiate a non-SDT procedure (e.g., an RRC establishment procedure or an RRC resume procedure) after receiving one or more CN paging messages from the serving RAN. In some implementations, the UE may perform the non-SDT procedure (e.g., an RRC establishment procedure or an RRC resume procedure) in response to the reception of a CN paging or a RAN paging (respectively) on the SDT-BWP in the uplink direction. In some implementations, the UE may be configured with a RACH configuration for a non-SDT procedure in the SDT-BWP_DL. In some such implementations, the UE may not need to switch from an SDT-BWP_DL to another DL-BWP (e.g., the initial DL-BWP or the default DL-BWP) while the UE is triggered to initiate a non-SDT procedure (e.g., an RRC establishment procedure or an RRC resume procedure) after receiving one or more CN paging messages from the serving RAN. In some implementations, the UE may perform the non-SDT procedure (e.g., an RRC establishment procedure or an RRC resume procedure) in response to the reception of a RAN paging or a CN paging on the SDT-BWP_DL in the downlink direction.

In some implementations, a common UL-BWP (e.g., an area-specific/RAN-specific or a cell-specific UL-BWP), which may be specific for SDT, may be configured to one or more UEs. In some such implementations, the common UL-BWP may include any combination of: a rach-ConfigCommon (which may configure the physical resource allocations for preamble transmission while an RA-SDT procedure is initiated); a pusch-ConfigCommon (which may configure the physical resource allocations for an RRC message & multiplexed SDT during the RA-SDT procedure); a pucch-ConfigCommon (which may configure the physical resource allocations for a HARQ Acknowledgement (HARQ-ACK) or a Negative Acknowledgement (NACK) message transmission during the RA-SDT procedure); and a msgA-ConfigCommon (which may configure the physical resource allocations for an MSGA transmission during the RA-SDT procedure via a 2-step RA procedure).

In some implementations, the common UL-BWP for an SDT procedure may be configured independently from the common UL-BWP for a non-SDT procedure. In some implementations, the UE may receive the configuration of a common UL-BWP for an SDT procedure via broadcasting cell-specific control signaling (e.g., broadcasting system information) or a UE-specific DL control signaling (e.g., an RRCReconfiguration message or an RRCRelease message). In some implementations, the UE may need to switch its UL-BWP from the common UL-BWP for an SDT procedure to the common UL-BWP for a non-SDT procedure (e.g., the initial UL-BWP or the default UL-BWP) if the UE falls back from an SDT procedure to a non-SDT procedure. In some implementations, the UE may not need to switch the UE's UL-BWP from the common UL-BWP for the SDT procedure to the common UL-BWP for the non-SDT procedure if the UE falls back from the SDT procedure to the non-SDT procedure. In some such implementations, the non-SDT procedure may be referred to an RRC connection resume procedure or an RA procedure for a CCCH logical channel.

In some implementations, the UE may also change the UL operating frequency carrier (e.g., from a NUL carrier to a SUL carrier or from a SUL carrier to a NUL carrier) after receiving one or more RAN or CN paging messages from the serving cell if the original operating frequency carrier is not configured with appropriate RACH resources for the following non-SDT procedure (e.g., an RRC Resume procedure or an RRC establishment procedure), and if another UL frequency carrier is configured with appropriate RACH resources for the following non-SDT procedure.

Impact of PWS Notification:

In some implementations, a UE may receive short message(s) that includes a PWS notification='1'/'true', which may indicate that the serving cell is (or is going to be) broadcasting system information related to PWS (e.g., SIB6 and SIB 7 for an ETWS service reception and/or SIB8 for a CMAS reception). In some implementations, the UE may be triggered to monitor the PWS information (e.g., a CMAS or an ETWS information, such as SIB8 or SIB6 and SIB7) immediately after receiving a short message, which may indicate a PWS notification message.

In some implementations, the running SDT procedure may be terminated, released, stopped, or aborted by the UE immediately after receiving the PWS notification (e.g., a PWS notification='1'/'true') from the serving cell. In some implementations, the SDT failure timer, if running, may be stopped by the UE after the UE receives the PWS notification='1'/'true' from the serving cell. In some implementations, the running SDT procedure may not be terminated, released, stopped, or aborted by the UE after receiving the PWS notification from the serving cell. In some implementations, the UE may receive the system information related to a PWS (e.g., SIB6 and SIB7 for an ETWS service reception and/or SIB8 for a CMAS reception) after the running SDT procedure completes.

In some implementations, the UE may trigger a MAC reset after receiving the PWS notification during the SDT procedure. In some implementations, the UE may not trigger a MAC reset after receiving the PWS notification during the SDT procedure. In some such implementations, the UE may still keep the running timers (e.g., an SDT-TAT timer or an SDT failure timer, such as T319a, as described in 3GPP TS 38.331) associated with the SDT procedure after receiving a PWS notification from the serving cell. In some such implementations, the running SDT procedure may not be impacted by the PWS notification.

In some implementations, the UE may need not to monitor the PWS notification (e.g., during an SDT procedure) while, at least, one of the following is fulfilled: the UE is not ETWS-capable or CMAS-capable (e.g., during the SDT procedure); and the UE has registered with a NW which does not support PWS (e.g., (Rel-16) SNPN).

Triggering Events of a MAC Reset During an SDT Procedure:

In some implementations, a UE may trigger a MAC reset (e.g., the RRC entity may instruct the MAC entity to implement a MAC reset) during an SDT procedure, such as, when: receiving one or more CN paging messages from the serving cell; receiving one or more RAN paging messages from the serving cell; after receiving a PWS notification via the short messages received from the serving cell; receiving, at least, a fallback instruction, which may instruct the UE to switch from an SDT procedure (e.g., a CG-SDT or an RA-SDT procedure) to a non-SDT procedure (e.g., an RRC Resume procedure, an RRC establishment procedure, or an RRC re-establishment procedure); re-selecting to a cell of the same RAT (e.g., E-UTRA or NR); re-selecting to a cell of other RATs (e.g., a UE re-selecting to an E-UTRA cell from an NR cell or vice versa).

Triggering MAC Reset During an SDT Procedure:

In some implementations, a UE may implement, at least, one of the followings when the MAC reset is triggered during an SDT procedure:

initialize Bj, for each activated logical channel, which are configured or activated during the SDT procedure, to zero, where Bj may represent the current bucket condition for logical channel j;

initialize SBj for each logical channel to zero if Sidelink resource allocation mode 1 is configured by RRC to be activated during SDT procedure, where SBj may represent the bucket contents for logical channel j associated with one (Layer-2) Destination ID in the PC5 interface;

stop/release (if running) all timers, for example, in some such implementations, a running SDT failure timer may be stopped/released/cleared with the MAC reset. In some implementations, a running SDT-Timing Advance Timer (SDT-TAT), which the configured grant configurations for an SDT (e.g., a CG-SDT configuration) would still be valid while the SDT-TAT is counting and the CG-SDT configuration, would become invalid after the SDT-TAT expires, would also be stopped/released/cleared (or be considered as expired) with the MAC reset. In some such implementations, the CG-SDT configurations or instances in the MAC entity would also be released with the release of the SDT-TAT. In other implementations, the running SDT failure timer may be stopped or released by the RRC entity (e.g., in the MAC entity or the RRC entity) while a running SDT procedure is stopped, released, cleared, or terminated by the events proposed in the present disclosure;

set the New Data Indicators (NDIs) for all uplink HARQ processes activated in the SDT procedure to the value 0;

sets the NDIs for all HARQ process IDs to the value 0 for monitoring PDCCH in Sidelink resource allocation mode 1;

stop, if any, ongoing Random Access procedure;

discard explicitly signalled contention-free Random Access Resources for 4-step RA type and 2-step RA type, which may also include the 2-step RA or 4-step RA procedure triggered for SDT, if any;

flush Msg3 buffer;

flush MSGA buffer;

cancel, if any, triggered Scheduling Request procedure;

cancel, if any, triggered Buffer Status Reporting procedure;

cancel, if any, triggered Power Headroom Reporting procedure;

cancel, if any, triggered consistent LBT failure;

cancel, if any, triggered Beam Failure Recovery procedure associated with the SDT procedure;

cancel, if any, triggered Sidelink Buffer Status Reporting procedure;

cancel, if any, triggered Pre-emptive Buffer Status Reporting procedure;

cancel, if any, triggered Recommended bit rate query procedure associated with the SDT procedure;

cancel, if any, triggered Configured uplink grant confirmation associated with the SDT procedure;

cancel, if any, triggered configured sidelink grant confirmation associated with the SDT procedure;

cancel, if any, triggered Desired Guard Symbol query associated with the SDT procedure;

flush the soft buffers for all DL HARQ processes associated with the SDT procedure;

for each DL HARQ process, consider the next received transmission for a TB as the very first transmission associated with the SDT procedure;

release, if any, Temporary C-RNTI;

reset all BFI COUNTERs associated with the SDT procedure; and reset all LBT COUNTERs associated with the SDT procedure.

PLMN Selection/SNPN Selection Instruction

In some implementations, a UE may be instructed (e.g., by the upper layer, such as a NAS layer) to perform PLMN selection (e.g., while the upper layer of the UE side switches out of the SNPN access mode or while the upper layer configures a target PLMN identifier for the UE to search for).

In some implementations, the UE may be instructed (e.g., by the upper layer, such as a NAS layer) to perform SNPN selection (e.g., while the upper layer of the UE side switches to the SNPN access mode or while the upper layer configures a target SNPN identifier for the UE to search for).

In some implementations, the UE may abort, delete, abort, or interrupt a running- or an initiated-SDT procedure immediately after the UE receives the instruction to perform a PLMN selection or an SNPN selection. In other implementations, the running SDT timers (e.g., an SDT-TAT timer, an SDT failure (e.g., detection) timer T319a, a T319, or an updated T319) may also be stopped immediately and the buffer (e.g., soft) may also be flushed immediately.

In other implementations, the UE may not abort or delete the running or initiated SDT procedure immediately after the UE receives the instruction to perform a PLMN selection or an SNPN selection. Instead, the UE may initiate a PLMN selection or an SNPN selection after the running SDT procedure is finished, terminated, stopped, deleted, or removed. In some such implementations, the UE may not transition from an RRC_INACTIVE state to an RRC_IDLE state directly while the UE receives the PLMN or SNPN selection instruction (e.g., from the upper layer) during the SDT procedure. In other implementations, the UE may transition from an RRC_INACTIVE state to an RRC_IDLE state after the running SDT procedure is finished or terminated (e.g., while the SDT failure (e.g., detection) timer T319a or a T319, or an updated T319 is stopped).

In other implementations, the proposed implementations for a PLMN selection or an SNPN selection may also be applicable to a RAT change (e.g., from NR to E-UTRA or vice versa) or a CN change (e.g., from a 5GC to an EPC or vice versa) instructed by the upper layer.

In some implementations, if a MAC entity is reset, Power Headroom Report (PHR) procedure may be terminated. In some such implementations, to support uplink operation transmissions (e.g., a PUSCH or a PUCCH) in dedicated carriers or active BWP(s), the UE may need to provide power headroom information of uplink physical channels (e.g., a PHR to the serving base station through a Uu interface during an SDT procedure) to the serving base station. In some such implementations, the serving base station may arrange uplink physical resources to the UE (e.g., an uplink dynamic grant) based on the received power headroom information from the UE during an SDT procedure.

In some implementations, a PHR configuration may be configured per MAC entity, which may be associated with SDT. In some implementations, the PHR procedure may support the UE to report a difference between a nominal UE maximum transmit power and an estimated power of a packet transmission, which may include any combination of a PUSCH & a PUCCH. In some implementations, the PHR procedure may be associated with a Uu interface (e.g., the UE may report a PHR to a serving gNB through a Uu interface). In some such implementations, the UE may transmit the PHR through the Uu interface if the UE is allocated with the UL resources that may accommodate the MAC CE for PHR (e.g., which the MAC entity is configured to transmit). In some implementations, Table 2 below may show detailed parameters for PHR.

TABLE 2

Parameters and UE behavior for PHR

| PHR configuration | Notes (TS 38.321) |
|---|---|
| phr-PeriodicTimer | (1) In some implementations, phr-PeriodicTimer = ENUMERATED {sf10, sf20, sf50, sf100, sf200, sf500, sf1000, infinity}, value in number of subframes for PHR reporting, sf10 may correspond to 10 subframes, sf20 corresponds to 20 subframes, and so on. |

TABLE 2-continued

Parameters and UE behavior for PHR

| PHR configuration | Notes (TS 38.321) |
|---|---|
| | (2) In some implementations, if the MAC entity has an active small data transmission and may be the first UL resource allocated for a new transmission in the SDT procedure (e.g., the uplink resource), the UE may start a phr-PeriodicTimer. (3) In some implementations, the UE may trigger a PHR if the phr-PeriodicTimer expires. (4) In some implementations, if the allocated physical resources (which may be associated with a UL) may accommodate the MAC CE for a PHR, which the MAC entity is configured to transmit, and the corresponding subheader, then the UE may transmit the PHR with the associated interface and the start or restart phr-PeriodicTimer |
| phr-ProhibitTimer phr-Tx-PowerFactorChange | (1) In some implementations, the phr-ProhibitTimer = ENUMERATED {sf0, sf10, sf20, sf50, sf100, sf200, sf500, sf1000}, value in number of subframes for PHR reporting. sf0 may correspond to 0 subframe, sf10 may correspond to 10 subframes, sf20 may correspond to 20 subframes, and so on. (2) In some implementations, the phr-Tx-PowerFactorChange = ENUMERATED {dB1, dB3, dB6, infinity}, value in dB for PHR reporting. Value dB1 may correspond to 1 dB, dB3 may correspond to 3 dB and so on. (3) In some implementations, the UE may trigger a PHR if the phr-ProhibitTimer expires or has expired and the path loss has changed more than the phr-Tx-PowerFactorChange dB for at least one activated Serving Cell (or the corresponding synchronization source or scheduler) of any MAC entity, which may be used as a pathloss reference, since the last transmission of a PHR in such MAC entity when the MAC entity has associated uplink resources for a new transmission. (2) In some implementations, the UE may trigger a PHR if the phr-ProhibitTimer expires or has expired, when the MAC entity has valid uplink resources for new transmission, and the following is valid for any of the activated Serving Cells of any MAC entity with a configured uplink: UL resources allocated for transmission in such cell or BWP are available, and the required power backoff due to power management for such cell or UE has changed more than the phr-Tx-PowerFactorChange dB since the last transmission of a PHR when the MAC entity had uplink resources allocated for transmission (e.g., an uplink configured grant or an uplink dynamic grant) during an SDT procedure. |

In some implementations, a PHR procedure may be cancelled with a MAC reset during an SDT procedure (e.g., depending on the associated resources), as shown in Table 3.

TABLE 3

PHR Procedure for MAC Reset

| MAC reset (TS 38.321) | Possibility |
|---|---|
| stop (if running) all timers; | 1) In some implementations, if the PHR procedure is introduced, the phr-ProhibitTimer and the phr-PeriodicTimer may be stopped with a MAC reset.<br>2) In some implementations, the phr-ProhibitTimer and/or thephr-PeriodicTimer may be stopped due to RAN paging or CN paging reception in the UE side.<br>3) In some implementations, the phr-ProhibitTimer and/or thephr-PeriodicTimer may be stopped due to short message reception in the UE side (e.g., due to a PWS notification).<br>4) In other implementations, the phr-ProhibitTimer and/or the phr-PeriodicTime may be stopped due to the SDT procedure being interrupted by one of the following:<br>a. an SDT failure event;<br>b. the UE falls back to a non-SDT procedure (e.g., an RRC (connection) establishment or resume procedure) by receiving a fallback instruction from the serving cell (e.g., DCI of a FallbackRAR message);<br>c. the SDT procedure is finished by the serving cell (e.g., the UE may receive an RRCRelease message from the serving cell to terminate the running SDT procedure);<br>d. a cell selection or reselection (e.g., an inter-frequency or an intra-frequency) to other serving cell;<br>e. a move to another RAT (e.g., E-UTRA); and<br>f the UE may receive an updated PHR configuration from the serving cell (e.g., via a UE-specific DL RRC signaling). |
| cancel, if any, triggered sidelink power headroom reporting procedure; | 1) In some implementations, if the PHR procedure is introduced, the triggered PHR procedure may be cancelled with a MAC reset and the stored PHR configuration may also be released.<br>In some such implementations:<br>a) if the PHR configuration is associated with an uplink resource (e.g., a PUCCH or a PUSCH during an SDT procedure), the triggered PHR procedure may be cancelled with a MAC reset;<br>b) the triggered PHR procedure may be cancelled due to short message reception in the UE side (e.g., due to a PWS notification);<br>c) the triggered PHR procedure may be cancelled due to RAN paging or CN paging reception in the UE side;<br>d) the triggered PHR procedure may be cancelled due to the SDT procedure being interrupted by one of the following:<br>a. an SDT failure event (e.g., an SDT failure (detection) timer expires);<br>b. The UE falls back to a non-SDT procedure (e.g., an RRC (connection) establishment or resume procedure) by receiving a fallback instruction from the serving cell (e.g., DCI or a FallbackRAR message);<br>c. The SDT procedure is finished by the serving cell (e.g., the UE may receive an to terminate the running SDT procedure);<br>d. a cell selection or reselection (e.g., an inter-frequency or an intra-frequency) to other serving cell;<br>e. a move to another RAT (e.g., E-UTRA); and<br>f. the UE may receive an updated PHR configuration from the serving cell (e.g., via a UE-specific DL RRC signaling). |

In some implementations, the PHR-configuration may be an optional configuration as a part of the SDT configuration. In some implementations, for a UE which may not be configured with a PHR configuration for an SDT procedure, the UE may not start a phr-ProhibitTimer and/or a phr-PeriodicTime, and may not trigger a PHR procedure.

In some implementations, if a MAC entity is reset, a Buffer Status Report (BSR) procedure during an SDT procedure may be terminated. In some implementations, the BSR procedure may include a BSR procedure on a Uu interface (e.g., the UE reports a BSR to a base station in the RAN). In some implementations, in the (LTE/NR) Uu interface, the "Regular Sidelink BSR", "Periodic Sidelink BSR", or "Padding Sidelink BSR" may be supported as LTE sidelink protocols (e.g., as specified in 3GPP TS 36.321.f.4.0). In some implementations, truncated BSR may be supported. In Uu interface, the UE may multiplex and assemble truncated BSR with uplink data and the multiplexed UL packet may be transmitted in a PUSCH. In some implementations, to a UE, different BSR configurations may be provided to an SDT procedure (in comparison with the BSR configurations for the UE in RRC Connected state). In some implementations, parameters of a BSR procedure may be represented by Table 4.

TABLE 4

Parameters and UE behavior for BSR

| BSR configuration | Note |
| --- | --- |
| periodicBSR-Timer | In some implementations, a timer for periodic BSR reporting (e.g., as shown in TS 36.321) |
| retxBSR-Timer | In some implementations, a timer for regular BSR reporting (e.g., as shown in TS 36.321) |
| logicalChGroupInfoList | In some implementations, may indicate for each logical channel group (which may include one or more logical channels that are active for an SDT). |
| logicalChannelSR-DelayTimerApplied | (1) In some implementations, logicalChannelSR-DelayTimerApplied = Boolean {true, false}<br>(2) In some implementations, each logical channel may be configured with a logicalChannelSR-DelayTimerApplied independently.<br>(3) In some implementations, may indicate whether to apply the delay timer for an SR transmission.<br>For example: "For Regular BSR, the MAC entity shall:<br>1> if the BSR is triggered for a logical channel for which logicalChannelSR-DelayTimerApplied is configured by upper layers:<br>2> start or restart the logicalChannelSR-DelayTimer<br>1> else:<br>2> if running, stop the logicalChannelSR-DelayTimer."<br>In some implementations, for a logical channel, which may be activated for an SDT procedure, such parameter may be set to FALSE if the logicalChannelSR-DelayTimer is not included in the BSR configuration. |
| logicalChannelSR-DelayTimer | (1) Insomeimplementations,a logicalChannelSR-DelayTimer = ENUMERATED {sf20, sf40, sf64, sf128, sf512, sf1024, sf2560, spare1}, value in number of subframes, sf1 may correspond to a subframe, sf2 corresponds to 2 subframes, and so on.<br>(2) In some implementations, the logicalChannelSR-DelayTimermaybe configured per MAC entity with independent values for BSR.<br>3) In some implementations, the UE may decide to trigger an SR procedure if a regular BSR has been triggered and the logicalChannelSR-DelayTimer is not running (e.g., the logicalChannelSR-DelayTimer in TS 38.321 in a Uu interface) |
| logicalChannelSR-Mask | (1) In some implementations, logicalChannelSR-Mask = BOOLEAN {true, false}<br>(2) In some implementations, each logical channel (e.g., activated for an SDT) may be configured with a logicalChannelSR-Mask independently.<br>(3) In some implementations, UE may control SR triggering when a configured sidelink grant (e.g., configured by RRC signalling) is configured (e.g., logicalChannelSR-Mask = true or the logicalChannelSR-Mask in TS 38.321 in a (NR/LTE) Uu interface. |

In some implementations, a BSR procedure may not be cancelled with a MAC reset, as shown in Table 5 below.

TABLE 5

BSR Procedure for MAC Reset

| MAC reset (TS 38.321) | Possibility |
|---|---|
| stop (if running) all timers; | 1) In some implementations, if a BSR procedure is introduced, a periodicBSR-Timer, a retxBSR-Timer and/or a logicalChannelSR-DelayTimer may be stopped with a MAC reset.<br>2) In some implementations, the periodicBSR-Timer, the retxBSR-Timer and/or the logicalChannelSR-DelayTimer may be stopped due to RAN paging or CN paging reception in the UE side.<br>3) In some implementations, the periodicBSR-Timer, the retxBSR-Timer and/or the logicalChannelSR-DelayTimer may be stopped due to a short message reception in the UE side (e.g., due to a PWS notification).<br>4) In other implementations, the periodicBSR-Timer, the retxBSR-Timer and/or the logicalChannelSR-DelayTimer may be stopped due to an SDT procedure being interrupted by one of the following:<br>a. an SDT failure event (e.g., while the SDT failure timer T319a expires);<br>b. the UE falls back to a non-SDT procedure (e.g., an RRC (connection) establishment or resume procedure) by receiving a fallback instruction from the serving cell (e.g., DCI of a FallbackRAR message);<br>c. the SDT procedure is finished by the serving cell (e.g., the UE may receive an RRCRelease message from the serving cell to terminate the running SDT procedure);<br>d. a cell selection or reselection (e.g., an inter-frequency or an intra-frequency) to other serving cell;<br>e. a move to another RAT (e.g., E-UTRA); and<br>f. the UE may receive an updated PHR configuration from the serving cell (e.g., via a UE-specific DL RRC signaling). |
| cancel, if any, triggered Buffer Status Reporting procedure; | 1) In some implementations, if BSR procedure is introduced, the triggered BSR procedure may be cancelled with a MAC reset and the stored BSR configuration may also be released in UE side.<br>2) In some implementations, the triggered BSR procedure may be cancelled due to RAN paging or CN paging reception in the UE side.<br>3) In some implementations, the triggered BSR procedure may be cancelled due to short message reception in the UE side (e.g., due to PWS notification).<br>4) In other implementations, the triggered BSR procedure may be cancelled due to an SDT procedure being interrupted by one of the following:<br>a. an SDT failure event (e.g., while the SDT failure timer T319a expires);<br>b. the UE falls back to a non-SDT procedure (e.g., an RRC (connection) establishment or resume procedure) by receiving a fallback instruction from the serving cell (e.g., DCI of a FallbackRAR message);<br>c. the SDT procedure is finished by the serving cell (e.g., the UE may receive an RRCRelease message from the serving cell to terminate the running SDT procedure);<br>d. a cell selection or reselection (e.g., an inter-frequency or an intra-frequency) to other serving cell;<br>e. a move to another RAT (e.g., E-UTRA); and<br>f. the UE may receive an updated PHR configuration from the serving cell (e.g., via a UE-specific DL RRC signaling). |

In some implementations, the BSR configuration may be an optional configuration, for example, as a part of an SDT configuration. In some implementations, for a UE which may not be configured with a BSR configuration for an SDT procedure, the UE may not start a periodicBSR-Timer, a retxBSR-Timer and/or a logicalChannelSR-DelayTimer, and may not trigger a BSR procedure.

In some implementations, small packet transmission may be supported during an RRC Inactive state. In some implementations, NR may support an RRC_INACTIVE state and UEs with infrequent (e.g., periodic and/or non-periodic) data transmission may generally be maintained by the network (NW) in the RRC_INACTIVE state. In older releases of 3GPP, the RRC_INACTIVE state may not support (small) data transmission. As such, the UE may have to resume the connection (e.g., by moving to an RRC_CONNECTED state) for any DL reception and/or UL data transmission. Connection setup and subsequent switching to an INACTIVE state according to such older releases may occur for each data transmission regardless of how small and infrequent the data packets are, which may result in unnecessary power consumption and signalling overhead.

In some implementations, signalling overhead, from UEs in an INACTIVE state, due to transmission of small data packets may be a general problem and may become a critical issue as the number of UE increases in NR not only for NW performance and efficiency but also for the UE battery performance. In general, any device that has intermittent small data packets in an (RRC) INACTIVE state may benefit from enabling SDT in an INACTIVE state. In some implementations, the key enablers for SDT in NR, namely the INACTIVE state, 2-step, 4-step RACH and configured grant type-1, have already been specified as a part of the legacy. As such, improvements are made to enable SDT in an INACTIVE state for NR.

According to 3GPP specifications, an RRC_INACTIVE state is a state where a UE remains in a CM-CONNECTED state and may move within an area configured by NG-RAN (e.g., the RNA) without notifying the NG-RAN. In an RRC_INACTIVE state, the last serving gNB node may keep the UE context and the UE-associated NG connection with the serving Access and Mobility Management Function (AMF) and User Plane Function (UPF).

Figure 2A:
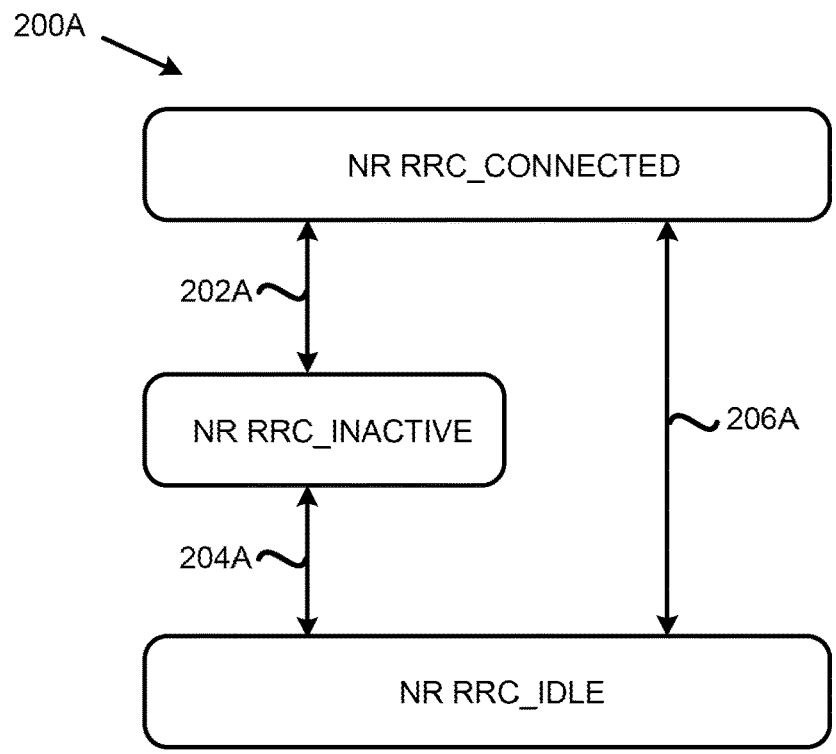
FIG. 2A is an RRC state transitioning diagram illustrating various RRC states and RRC transition procedures that a UE may undergo within a radio access network, according to an example implementation of the present disclosure.

FIG. 2A is an RRC state transitioning diagram 200A illustrating various RRC states and RRC transition procedures that a UE may undergo within a radio access network (RAN), according to an example implementation of the present disclosure. It should be noted that although actions in this and other Figures are illustrated as separate actions represented as independent blocks, these separately delineated actions should not be construed as necessarily order dependent. The order in which the actions are performed is not intended to be construed as a limitation, and any number of the disclosed blocks may be combined in any order to implement the method, or an alternate method. Moreover, one or more of the actions may be omitted in some of the present implementations.

In some implementations, a UE may only have an RRC state in NR at a time as illustrated in FIG. 2A. In some implementations, when the UE is in an NR RRC_CONNECTED state and is released (e.g., with suspension) 202A, the UE may transit to an NR RRC_INACTIVE state. In some such implementations, the UE is further released 204A from the NR RRC_INACTIVE state, the UE may transit to an NR RRC_IDLE state. In some implementations, when the UE is in an NR RRC_INACTIVE state, the UE may resume 202A connection and transit to an NR RRC_CONNECTED state. In some implementations, when the UE is in an NR RRC_CONNECTED state and is released 206A from a connection, the UE may transit directly from the NR RRC_CONNECTED state to an NR RRC_IDLE state. In some implementations, when the UE is in an NR RRC_IDLE state, and the UE is to establish 206A a connection, the UE may transit directly from to the NR RRC_IDLE state to an NR RRC_CONNECTED state.

In some implementations, an RRC_INACTIVE state may support at least the following functions; PLMN/SNPN selection; broadcast of system information; cell re-selection mobility; paging initiated by NG-RAN (RAN paging); RAN-based notification area (RNA) managed by NG-RAN; DRX for RAN paging configured by NG-RAN; 5GC-NG-RAN connection (both C-/U-planes) established for UE; UE Inactive AS context stored in NG-RAN and the UE; and NG-RAN acknowledging the RNA to which the UE belongs, etc.

In some implementations, for NR connected to 5GC, the UE identity "I-RNTI" may be used to identify the UE (Inactive) context in an RRC_INACTIVE state. In some such implementations, the I-RNTI may provide a new NG-RAN node a reference to the UE context in an old NG-RAN node. In some implementations, proper configuration in the old NG-RAN and the new NG-RAN node may allow the new NG-RAN node to resolve the old NG-RAN ID from the I-RNTI. In some implementations, some typical partitioning of a 40 bit I-RNTI may assume the following:

- UE specific reference, which may be a reference to the UE context within a logical NG-RAN node;
- NG-RAN node address index, which may be information to identify the NG-RAN node that has allocated the UE specific part;
- PLMN-specific information, which may be information supporting NW sharing deployments, and providing an index to the PLMN ID part of the Global NG-RAN node identifier;
- SNPN-specific information in which a SNPN may be a small PLMN configured by the operator. Each SNPN may be identified by a unique SNPN identity (e.g., an identifier of an SNPN including a PLMN ID and an NID combination). A configured grant configuration may be associated with an SNPN ID.

In some implementations, UE Inactive AS Context may be stored when the connection is suspended (e.g., when a UE is in an RRC_INACTIVE state) and restored when the connection is resumed (e.g., when the UE transits from an RRC_INACTIVE state to an RRC_CONNECTED state). In some implementations, the suspension of the RRC connection may be initiated by a NW. In some such implementations, when the RRC connection is suspended, the UE may store the UE Inactive AS context and any configuration received from the NW, and transit to an RRC_INACTIVE state.

In some implementations, if the UE is configured with a SCG, the UE may release the SCG configuration upon initiating an RRC Connection Resume procedure. In some implementations, the RRC message to suspend the RRC connection is integrity protected and ciphered. In some implementations, resumption of a suspended RRC connection may be initiated by upper layers when the UE needs to transit from an RRC_INACTIVE state to an RRC_CONNECTED state or by an RRC layer to perform an RNA update or by RAN paging from an NG-RAN. In some implementations, when the RRC connection is resumed, the NW may configure the UE based on the RRC connection resume procedure, which may be based on the stored UE Inactive AS context and any RRC configuration received from the NW. In some such implementations, the RRC connection resume procedure may re-activate AS security and re-establish SRB(s) and DRB(s).

In some implementations, in response to a request to resume the RRC connection, the NW may: resume the suspended RRC connection and send the UE to an RRC_CONNECTED state; reject the request to resume and send the UE to an RRC_INACTIVE state (e.g., with a wait timer); directly re-suspend the RRC connection and send the UE to an RRC_INACTIVE state; directly release the RRC connection and send the UE to an RRC_IDLE state; or instruct the UE to initiate NAS level recovery (e.g., in such case, the NW sends an RRC setup message).

In some implementations, when the UE is in an RRC_INACTIVE state, a UE specific DRX may be configured by the upper layers or by an RRC layer. In some implementations, the UE controlled mobility may be based on NW configuration. In some implementations, the UE may store the UE Inactive AS context, and a RAN-based notification area may be configured by an RRC layer. Furthermore, the UE, in an RRC_INACTIVE state, may perform the following: monitor short messages transmitted with P-RNTI over DCI; monitor a paging channel for CN paging using 5G-S-TMSI and RAN paging using full I-RNTI; perform neighboring cell measurements and cell selection or reselection; perform RAN-based notification area updates periodically and when moving outside the configured RAN-based notification area; and acquire system information and may send SI request (e.g., if configured).

Figure 2B:
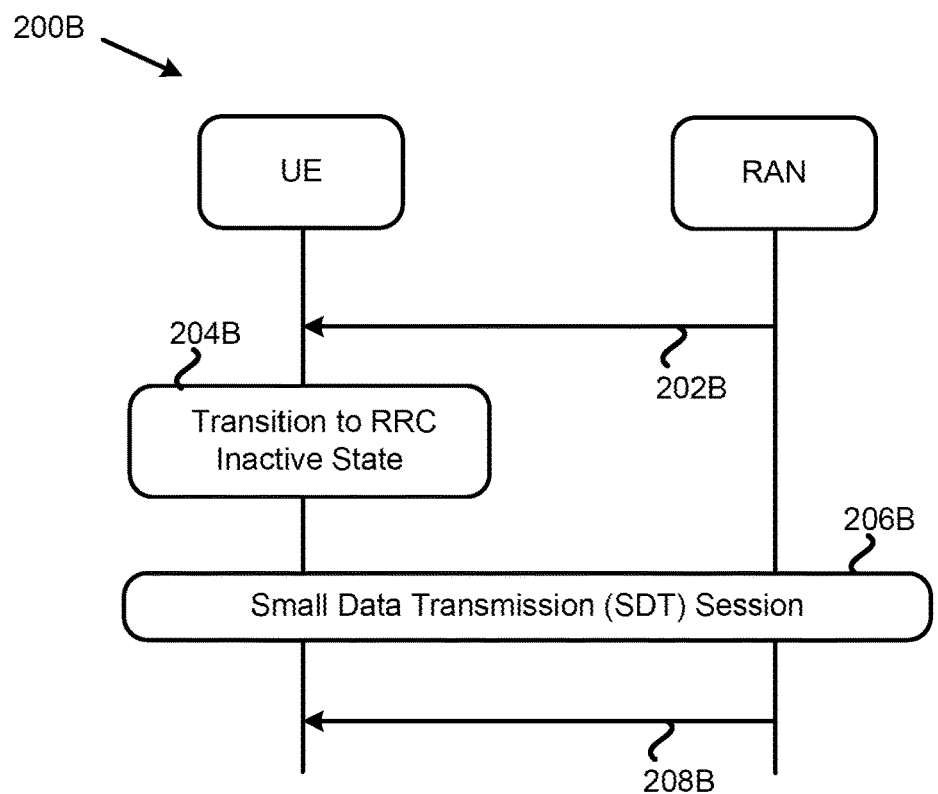
FIG. 2B is a diagram illustrating an SDT configuration with an SDT session or procedure, according to an example implementation of the present disclosure.

FIG. 2B is a diagram 200B illustrating an SDT configuration with an SDT session or procedure, according to an example implementation of the present disclosure. In some implementations, a UE may receive SDT configuration (e.g., 202B) from a serving RAN as shown in FIG. 2B. In some such implementations, the UE may receive SDT configuration via DL UE-specific signaling (e.g., an RRCReconfiguration message and/or an RRCRelease message) from the serving RAN, such as a $1^{st}$ serving cell associated with the UE. In some implementations, after receiving the SDT configuration (e.g., 202B) from the serving RAN, the UE may transition to an RRC_INACTIVE state (e.g., 204B). In some such implementations, the $1^{st}$ serving cell may configure a UL-CG configuration (or CG-PUSCH resource configurations) and/or random access resources (e.g., a UE-specific or a UE-common, or a cell-specific) for the UE to implement SDT after the UE moves to an RRC_INACTIVE state later on. In some implementations, after the UE moves to the RRC_INACTIVE state (e.g., 204B), the UE and the serving RAN may be in an SDT session/SDT procedure (e.g., 206B). In some such implementations, the serving RAN may send an RRCRelease message (e.g., 208B) to the UE to finish the active SDT session/SDT procedure (e.g., 206B).

In other implementations, the CG-PUSCH resource and/or the RA resource configuration may locate on a (normal) uplink carrier (e.g., a UL carrier or a NUL carrier) and/or a supplementary uplink carrier (e.g., an SUL carrier). In some such implementations, after receiving the SDT configuration (e.g., while the UE is staying in an RRC_CONNECTED state at this stage), the UE may store the SDT configuration after the UE moves to an RRC_INACTIVE state (e.g., after receiving the RRCRelease message from the $1^{st}$ serving cell, which may instruct the UE to move to an RRC_INACTIVE state).

In some implementations, while some packets (belonging to the SDT radio bearers, which may also be configured in the SDT configuration) arrives, the UE may start an SDT session accordingly (e.g., by transmitting the encoded packets on the configured UL-CG configuration directly with or without transmitting an RRCResume Request message, or by transmitting a preamble first with or without attaching an encoded packet during a 2-step RA procedure triggered as a part of the SDT session, or by transmitting a preamble as an MSG1 and the following RRCResumeRequest message/encoded packet in a 4-step RA procedure) with the $2^{nd}$ serving cell. In some such implementations, the $2^{nd}$ serving cell may be the same as the $1^{st}$ serving cell in some scenarios but the $2^{nd}$ serving cell may be different from the $1^{st}$ serving cell in some other scenarios. In some implementations, after the UE initiate an SDT session/SDT procedure (e.g., either a CG-SDT procedure or a RA-SDT procedure), the serving cell (e.g., the $1^{st}$ serving cell or the $2^{nd}$ serving cell) may continue the SDT procedure by transmitting DL packets to the UE or providing dynamic UL grants to the UE for the subsequent DL/UL packet exchanges during the SDT procedure (and so the SDT failure timer (T319a) is still counting (in both serving BS/UE sides) with the extension of SDT procedure). In some such implementations, HARQ protocols may be configured as a part of the SDT configuration and be implemented in DL/UL packet exchange(s) during the SDT session/SDT procedure.

In some implementations, in order to finish an active SDT session (or an SDT procedure), the $2^{nd}$ serving cell may transmit a $2^{nd}$ RRCRelease message to instruct the UE to finish the SDT session. In some such implementations, the UE may keep the stored SDT configuration and stay in an RRC_INACTIVE state after receiving the $2^{nd}$ RRCRelease message to finish the active SDT session.

In some implementations, the UE may trigger an SDT failure (detection) timer while an SDT procedure (e.g., a CG-SDT or an RA-SDT procedure) is initiated in the UE side. In some such implementations, the UE may start or restart the SDT failure (detection) timer after one or more successful DL/UL packet exchanges during the SDT procedure. In some such implementations, the UE may consider the SDT procedure has failed if the SDT failure (detection) timer expires during the SDT procedure. In some such implementations, the UE may terminate, delete, or remove the running SDT procedure. In some implementations, the SDT failure (detection) timer may be an updated T319 timer (e.g., a larger T319 value may be configured for SDT procedure) in 3GPP NR protocols. In some such implementations, the SDT failure (detection) timer may be stopped or released while the associated SDT procedure successfully terminates or fails to terminate.

In some implementations, the UE may be configured with an SDT Timing Advance Timer (SDT-TAT) for an SDT CG resource. In some implementations, the UE may start to count the SDT-TAT to zero while the UE moves to an RRC_IDLE state. In some such implementations, the UE may consider the configured CG resource for SDT is still valid or applicable only while the SDT-TAT is still running. In some implementations, the UE may start or restart the SDT-TAT while the UE obtains a valid uplink timing advance instruction (e.g., via a MAC CE or a RAR message during the SDT procedure or during an RA procedure) from the serving cell. In some implementation, the UE may or may not stop or release the SDT-TAT while the UE moves from an RRC_INACTIVE state to an RRC_CONNECTED state. In some implementation, the UE may stop or release the SDT-TAT while the UE moves from an RRC_INACTIVE state to an RRC_CONNECTED state. In some such implementations, the UE may keep counting SDT-TAT after an SDT procedure finishes, terminates, is released, or drops.

In some implementations, a UE may monitor PDCCH(s) in order to find possible grants for uplink transmission, and the UE may be provided with uplink configured grant configuration. In some such implementations, the uplink configured grant configuration may be for SDT configuration or CG-SDT procedure. In some implementations, in the uplink, the gNB may dynamically allocate resources to UEs via C-RNTI on PDCCH(s). In some implementations, a UE may monitor the PDCCH(s) in order to find possible grants for uplink transmission when the UE's downlink reception is enabled (e.g., activity governed by DRX when configured). In some implementations, when Carrier Aggregation (CA) is configured, the same C-RNTI may apply to all serving cells.

In other implementations, with CGs, the gNB may allocate uplink resources for the initial HARQ transmissions to UEs. In some implementations, two types of configured uplink grants may be a Type 1 and a Type 2. In some such implementations, with regards to Type 1, RRC may directly provide the configured uplink grant (e.g., including the periodicity). In some implementations, with regards to Type 2, RRC may define the periodicity of the configured uplink grant while the PDCCH addressed to CS-RNTI may either signal and activate the configured uplink grant, or deactivate the configured uplink grant (e.g., a PDCCH addressed to CS-RNTI may indicate that the uplink grant may be implicitly reused based on the periodicity defined by RRC, until deactivated).

In some implementations, Type 1 and Type 2 configured uplink grants may be configured by RRC per serving cell and per (UL) BWP. In some implementations, multiple configurations may be active simultaneously only on different serving cells. In some implementations, regarding Type 2, activation and deactivation are independent among the serving cells. In some such implementations, regarding the same serving cell, the MAC entity may be configured with either one or more Type 1 and/or Type 2 configured uplink grant(s).

In some implementations, RRC may configure the following parameters when the configured grant Type 1 is configured: CS-RNTI for retransmission; periodicity of the configured grant Type 1; timeDomainOffset indicating offset of a resource with respect to SFN=0 in time domain; timeDomainAllocation indicating allocation of configured uplink grant in time domain which contains startSymbolAndLength (e.g., SLIV in TS 38.214); and nrofHARQ-Processes indicating the number of HARQ processes for configured grant.

In some implementations, upon configuration of a configured grant Type 1 for a serving cell by upper layers, the MAC entity may: store the uplink grant provided by upper layers as a configured uplink grant for the indicated serving cell; initialise or re-initialise the configured uplink grant to start in the symbol based on timeDomainOffset and S (e.g., derived from SLIV as specified in TS 38.214), and reoccur with periodicity.

In 3GPP technical specifications, regarding RA Procedure, RA resource configuration (e.g., for SDT configuration), and RA-SDT procedure, two types of RA procedure are supported: a 4-step RA type (e.g., with MSG1) including, for example, a Contention-Free Random Access (CFRA) and/or a 4-step Contention-Based Random Access (CBRA), and a 2-step RA type (e.g., with MSGA) including, for example, a 2-step CFRA and/or a 2-step CBRA. In some such implementations, both types of RA procedure may support CBRA and CFRA.

In some implementations of the present disclosure, the UE may select the type of RA at initiation of the RA procedure based on NW configuration when: CFRA resources are not configured, where an RSRP threshold is used by the UE to select between a 2-step RA type and a 4-step RA type; CFRA resources for a 4-step RA type are configured, where UE performs RA with a 4-step RA type; and CFRA resources for a 2-step RA type are configured, where the UE performs RA with a 2-step RA type.

In some implementations, the NW (e.g., serving RAN of the UE) may not configure CFRA resources for 4-step and 2-step RA types at the same time for a BWP. In some implementations, CFRA with a 2-step RA type may only be supported for handover(s).

In some implementations, an MSGA of the 2-step RA type may include a preamble on a PRACH and a payload on a PUSCH. In some implementations, after MSGA transmission, the UE may monitor for a response from the NW within a configured window. In some implementations, for CFRA, upon receiving the NW response, the UE may end the RA procedure. In some implementations, for CBRA, if contention resolution is successful upon receiving the NW response, the UE may end the RA procedure. In some such implementations, if fallback indication is received in an MSGB, the UE may perform MSG3 transmission and monitor contention resolution. In some implementations, if contention resolution is not successful after MSG3 transmission(s) or retransmission(s), the UE may go back to MSGA transmission.

In some implementations, if the RA procedure with a 2-step RA type is not completed after a number of MSGA transmissions, the UE may be configured to switch to CBRA with a 4-step RA type.

In some implementations, for random access in a cell configured with an SUL, the NW may explicitly signal which carrier to use (e.g., a UL or an SUL). Otherwise, the UE may select the SUL carrier if and only if the measured quality of the DL is lower than a broadcast threshold. In some implementations, the UE may perform carrier selection before selecting between a 2-step RA type and a 4-step RA type. In some implementations, the RSRP threshold for selecting between a 2-step RA type and a 4-step RA type may be configured separately for a UL and an SUL. In some implementations, once started, all uplink transmissions of the RA procedure remain on the selected carrier.

In some implementations, when a CA is configured, an RA procedure with a 2-step RA type may only be performed on a PCell while contention resolution may be cross-scheduled by the PCell.

In some implementations, when the CA is configured, an RA procedure with a 4-step RA type, the first three steps of CBRA may occur on the PCell while contention resolution (e.g., step 4) may be cross-scheduled by the PCell. In some implementations, the three steps of a CFRA started on the PCell may remain on the PCell. In some implementations, the CFRA on a SCell may only be initiated by the gNB to establish timing advance for a secondary TAG. In some implementations, the procedure may be initiated by the gNB with a PDCCH order (e.g., step 0) that is sent on a scheduling cell of an activated SCell of a secondary TAG, preamble transmission (e.g., step 1) may take place on an indicated SCell, and an RA Response (e.g., step 2) may take place on the PCell.

In some implementations, during an RA-SDT procedure, the UE may transmit the pending data in an MSG1 or an MSG3 or the following successive UL packets during a 4-step RA procedure, which may be ended after receiving an RRCRelease message from the serving RAN to finish an active SDT procedure. In some implementations, during an RA-SDT procedure, the UE may transmit the pending data in an MSGA and the following UL packets during a 2-step RA procedure, which may be ended after receiving an RRCRelease message from the serving RAN to finish an active SDT procedure.

In some implementations, in order to improve UL coverage for high frequency scenarios, Supplementary Uplink Carrier (SUL) may be configured. With SUL, the UE may be configured with 2 ULs for a DL of the same cell.

Figure 3:
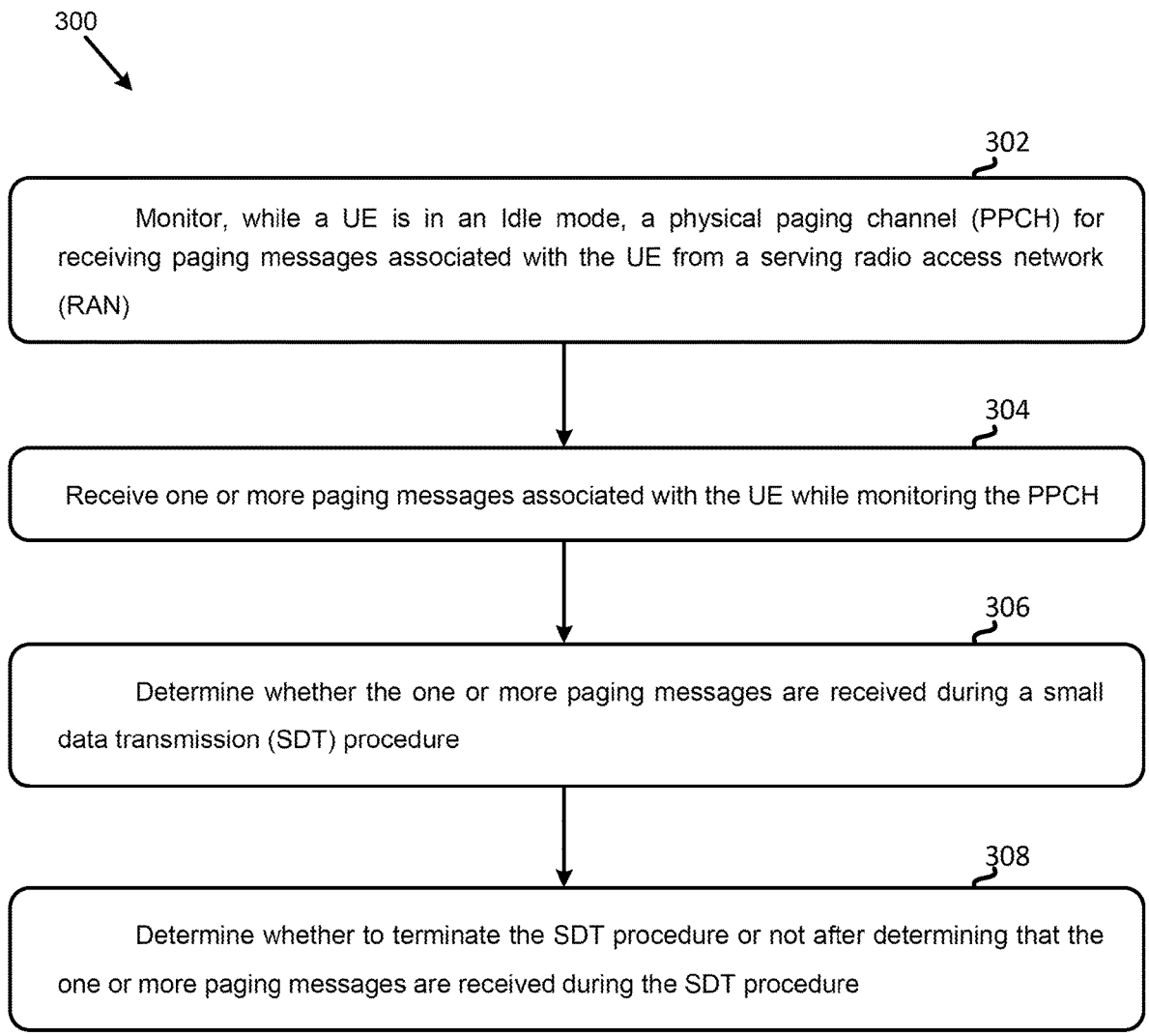
FIG. 3 is a flowchart illustrating a method or process for monitoring paging message(s) during an SDT procedure, according to an example implementation of the present disclosure.

FIG. 3 a flowchart illustrating a method or process 300 for monitoring paging message(s) during an SDT procedure, according to an example implementation of the present disclosure. As illustrated in FIG. 3, process 300 may start, in action 302, by monitoring, while a UE is in an Idle mode (e.g., in an (RRC) Inactive state or (RRC) Idle state), a physical paging channel (PPCH) for receiving paging messages (e.g., one or more paging messages) associated with the UE from a serving radio access network (RAN). In some implementations, the one or more paging messages may include a paging message that includes access type information associated with a small data transmission (SDT) procedure. In some implementations, the one or more paging messages may include a paging message that includes at least downlink control information (DCI) and paging records, as described above. In some implementations, the one or more paging messages may include one or more serving core network (CN) paging messages and/or one or more serving RAN paging messages.

In some implementations, monitoring the PPCH for receiving the one or more paging messages associated with the UE may include monitoring the PPCH for receiving only the serving core network CN paging message(s) and not the serving RAN paging message(s). In some implementations, the serving CN paging message(s) associated with the UE may include at least one CN paging message that includes a fifth generation (5G)-Serving-Temporary Mobile Subscriber Identity (TMSI) (5G-S-TMSI) configured by the serving CN and an Inactive-Radio Network Temporary Identifier (I-RNTI) configured by the serving RAN. In some such implementations, monitoring the PPCH for receiving only the serving CN paging messages may include decoding the 5G-S-TMSI in the at least one CN paging message and ignoring the I-RNTI.

After monitoring the PPCH for receiving one or more paging messages, the UE, in action 304, may receive one or more paging messages associated with the UE while monitoring the PPCH. In some implementations, after the UE receives the one or more paging messages associated with the UE while monitoring the PPCH, the UE, in action 306, may determine whether the one or more paging messages are received during an SDT procedure. In some such implementations, the SDT procedure may include one of a Configured-Grant Small Data Transmission (CG-SDT) procedure or a Random Access Small Data Transmission (RA-SDT) procedure.

In action 308, the UE may determine whether to terminate the SDT procedure or not after determining that the one or more paging messages are received during the SDT procedure. In some implementations, a medium access control (MAC) entity of the UE may be resumed during the SDT procedure. In some implementations, determining whether to terminate the SDT procedure or not may include determining to terminate the SDT procedure and terminating the SDT procedure by resetting the MAC entity. In some implementations, determining whether to terminate the SDT procedure or not may include determining to terminate the SDT procedure while the UE is in a radio resource control (RRC) Inactive state, staying in the RRC Inactive state after terminating the SDT procedure, and attempting to connect with the serving RAN by initiating an RRC resume procedure while the UE is in the RRC Inactive state.

In some implementations, determining whether to terminate the SDT procedure or not may include determining to terminate the SDT procedure while the UE is in an RRC Inactive state, transitioning from the RRC Inactive state to an RRC Idle state after terminating the SDT procedure, and attempting to connect with the serving RAN by initiating an RRC establishment procedure after transitioning to the RRC Idle state. In some implementations, determining whether to terminate the SDT procedure or not may include determining whether to terminate the SDT procedure or not based on the access type information in the at least one paging message.

Figure 4:
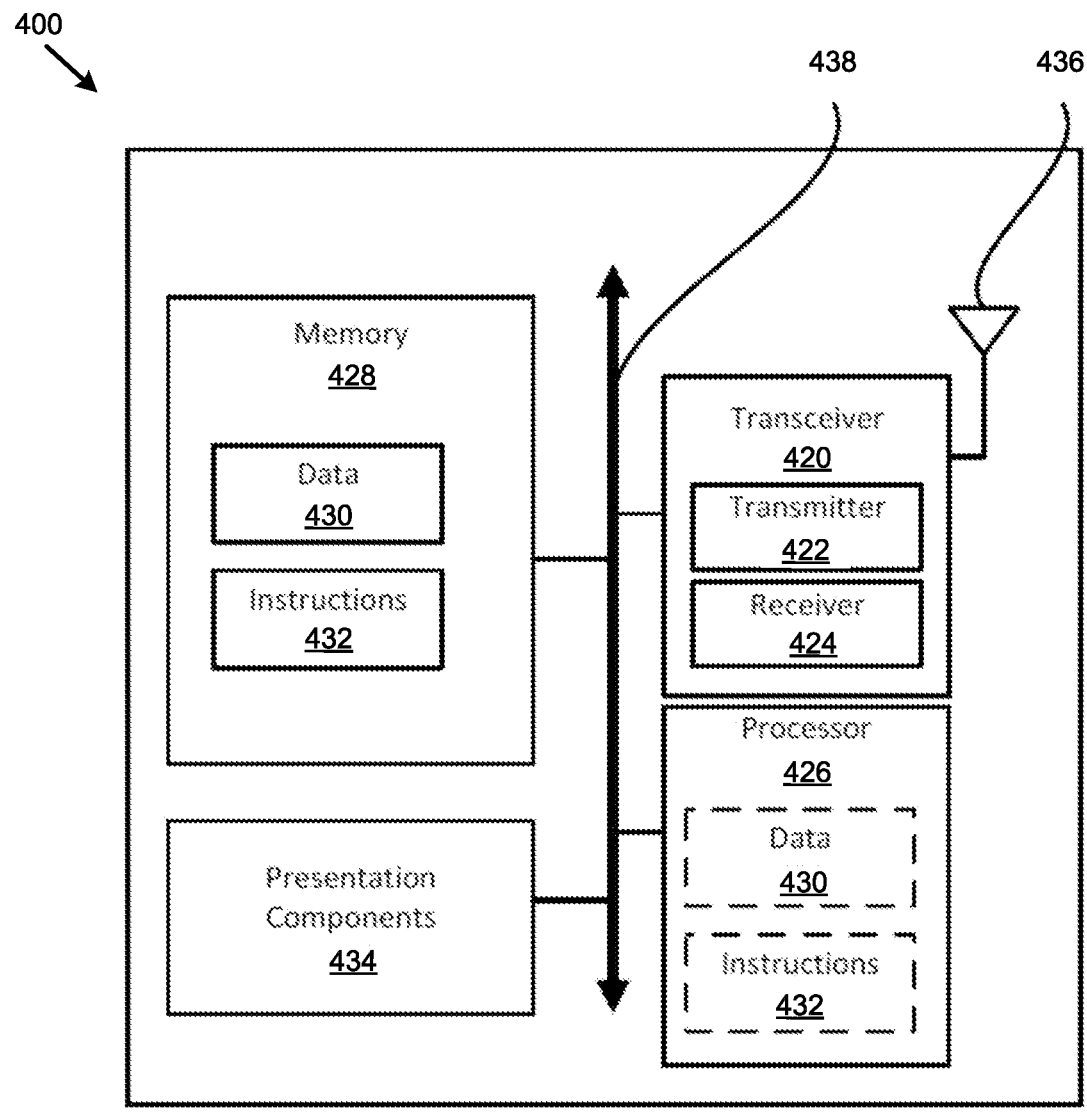
FIG. 4 is a block diagram illustrating a node for wireless communication, according to an example implementation of the present disclosure.

In some implementations of the present disclosure, the method and functions described with reference to FIGS. 1-3 may be implemented by a node, such as the node 400 depicted in FIG. 4. FIG. 4 is a block diagram illustrating a node 400 for wireless communication, according to one example implementation of the present disclosure. As shown in FIG. 4, the node 400 may include a transceiver 420, a processor 426, a memory 428, one or more presentation components 434, and at least one antenna 436. The node 400 may also include a Radio Frequency (RF) spectrum band module, a base station communications module, a network communications module, and a system communications management module, input/output (I/O) ports, I/O components, and a power supply (not explicitly shown in FIG. 4) in which each of the components above may be in communication with each other, directly or indirectly, over one or more buses 438.

The transceiver 420 may include a transmitter 422 and a receiver 424 configured to transmit and/or receive time and/or frequency resource partitioning information. In some implementations, the transceiver 420 may be configured to transmit in different types of subframes and slots including, but not limited to, usable, non-usable and flexibly usable subframes and slot formats. The transceiver 420 may be configured to receive data and control signaling.

The node 400 may include a variety of computer-readable media. Computer-readable media may be any available media accessible by the node 400 and include both volatile and non-volatile media, removable and non-removable media. By way of example, and not limitation, computer-readable media may include computer storage media and communication media. Computer storage media may include both volatile and non-volatile, removable and non-removable media implemented in any method or technology for storage of information, such as computer-readable instructions, data structures, program modules or other data.

Computer storage media may include RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media do not include a propagated data signal. Communication media may embody computer-readable instructions, data structures, program modules or other data in a modulated data signal such as a carrier wave or other transport mechanism and includes any information delivery media. The term "modulated data signal" may be a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. Combinations of any of the above should also be included within the scope of computer-readable media.

The memory 428 may include computer-storage media in the form of volatile and/or non-volatile memory. The memory 428 may be removable, non-removable, or a combination thereof. Exemplary memory may include solid-state memory, hard drives, optical-disc drives, etc. As illustrated in FIG. 4, the memory 428 may store computer-readable, computer-executable instructions 432 (e.g., software codes) that are configured to, when executed, cause the processor 426 to perform various functions described herein, for example, with reference to FIGS. 1-3. Alternatively, instructions 432 may not be directly executable by the processor 426 but be configured to cause the node 400 (e.g., when compiled and executed) to perform various functions described herein.

The processor 426 may include an intelligent hardware device, for example, a central processing unit (CPU), a microcontroller, an ASIC, etc. The processor 426 may include memory. The processor 426 may process data 430 and instructions 432 received from the memory 428, and information through the transceiver 420, the base band communications module, and/or the network communications module. The processor 426 may also process information to be sent to the transceiver 420 for transmission through the antenna 436, and further to the network communications module for transmission to a core network.

The one or more presentation components 434 may present data indications to a person or other device. For example, the one or more presentation components 434 may include a display device, speaker, printing component, vibrating component, etc.

From the above description it is manifest that various techniques can be used for implementing the concepts described in the present disclosure without departing from the scope of those concepts. Moreover, while the concepts have been described with specific reference to certain implementations, a person of ordinary skill in the art may recognize that changes can be made in form and detail without departing from the scope of those concepts. As such, the described implementations are to be considered in all respects as illustrative and not restrictive. It should also be understood that the present disclosure is not limited to the particular implementations described above, but many rearrangements, modifications, and substitutions are possible without departing from the scope of the present disclosure.

What is claimed is:

1. A method performed by a user equipment (UE) for monitoring paging messages, the method comprising:
    monitoring, while the UE is in an Idle mode, a physical paging channel (PPCH) for receiving paging messages associated with the UE from a serving radio access network (RAN);
    receiving one or more paging messages associated with the UE while monitoring the PPCH;
    initiating, while the UE is in the Idle mode, a small data transmission (SDT) procedure;
    monitoring, during the SDT procedure, a paging occasion (PO) to obtain one or more short messages from paging downlink control information (DCI); and
    refraining from decoding a paging record associated with the paging DCI after the UE decodes the DCI for obtaining the one or more short messages during the SDT procedure.

2. The method of claim 1, wherein the one or more paging messages comprise at least one of a serving core network (CN) paging message or a serving RAN paging message.

3. The method of claim 2, wherein monitoring the PPCH for receiving the one or more paging messages associated with the UE comprises monitoring the PPCH for receiving only serving CN paging messages and not serving RAN paging messages.

4. The method of claim 3, wherein:
    the one or more paging messages associated with the UE comprise at least one serving CN paging message that includes a fifth generation (5G)-Serving-Temporary Mobile Subscriber Identity (TMSI) (5G-S-TMSI) configured by the serving CN and at least one serving RAN paging message that includes an Inactive-Radio Network Temporary Identifier (I-RNTI) configured by the serving RAN, and
    monitoring the PPCH for receiving only the serving CN paging messages comprises decoding the 5G-S-TMSI in the at least one CN paging message and ignoring the I-RNTI.

5. The method of claim 1, wherein the SDT procedure comprises one of a Configured-Grant Small Data Transmission (CG-SDT) procedure or a Random Access Small Data Transmission (RA-SDT) procedure.

6. A user equipment (UE), comprising:
    at least one processor; and
    at least one non-transitory computer-readable medium coupled to the at least one processor and storing one or more computer-executable instructions that, when executed by the at least one processor, cause the UE to:
        monitor, while the UE is in an Idle mode, a physical paging channel (PPCH) for receiving paging messages associated with the UE from a serving radio access network (RAN);
        receive one or more paging messages associated with the UE while monitoring the PPCH;
        initiate, while the UE is in the Idle mode, a small data transmission (SDT) procedure;
        monitor, during the SDT procedure, a paging occasion (PO) to obtain one or more short messages from paging downlink control information (DCI); and
        refrain from decoding a paging record associated with the paging DCI after the UE decodes the DCI for obtaining the one or more short messages during the SDT procedure.

7. The UE of claim 6, wherein the one or more paging messages comprise at least one of a serving core network (CN) paging message or a serving RAN paging message.

8. The UE of claim 7, wherein monitoring the PPCH for receiving the one or more paging messages associated with the UE comprises monitoring the PPCH for receiving only serving CN paging messages and not serving RAN paging messages.

9. The UE of claim 8, wherein:
    the one or more paging messages associated with the UE comprise at least one serving CN paging message that includes a fifth generation (5G)-Serving-Temporary Mobile Subscriber Identity (TMSI) (5G-S-TMSI) configured by the serving CN and at least one serving RAN paging message that includes an Inactive-Radio Network Temporary Identifier (I-RNTI) configured by the serving RAN, and monitoring the PPCH for receiving only the serving CN paging messages comprises decoding the 5G-S-TMSI in the at least one CN paging message and ignoring the I-RNTI.

10. The UE of claim 6, wherein the SDT procedure comprises one of a Configured-Grant Small Data Transmission (CG-SDT) procedure or a Random Access Small Data Transmission (RA-SDT) procedure.

11. The method of claim 1, wherein the one or more short messages comprise at least one of a system information update indication, a stop paging monitoring indication, an earthquake and tsunami warning system (ETWS) indication, or a commercial mobile alerting system (CMAS) indication.

12. The UE of claim 6, wherein the one or more short messages comprise at least one of a system information update indication, a stop paging monitoring indication, an earthquake and tsunami warning system (ETWS) indication, or a commercial mobile alerting system (CMAS) indication.

* * * * *